(12) United States Patent
Lu et al.

(10) Patent No.: US 11,846,711 B2
(45) Date of Patent: Dec. 19, 2023

(54) METHOD OF FABRICATING SOLID-STATE LIGHT STEERING SYSTEM

(71) Applicant: Beijing Voyager Technology Co., Ltd., Beijing (CN)

(72) Inventors: Yue Lu, Mountain View, CA (US); Youmin Wang, Mountain View, CA (US); Anan Pan, Mountain View, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 456 days.

(21) Appl. No.: 17/135,903

(22) Filed: Dec. 28, 2020

(65) Prior Publication Data

US 2022/0206161 A1 Jun. 30, 2022

(51) Int. Cl.
*G01S 17/931* (2020.01)
*G02B 26/12* (2006.01)
*G01S 7/487* (2006.01)
*G02B 26/08* (2006.01)
*G01S 7/481* (2006.01)

(52) U.S. Cl.
CPC .......... *G01S 17/931* (2020.01); *G01S 7/4876* (2013.01); *G02B 26/0833* (2013.01); *G02B 26/122* (2013.01); *G01S 7/4817* (2013.01)

(58) Field of Classification Search
CPC .... G01S 17/931; G01S 7/4876; G01S 7/4817; G01S 17/42; G01S 17/89; G02B 26/0833; G02B 26/122; G02B 26/121; G02B 26/123
See application file for complete search history.

(56) References Cited

U.S. PATENT DOCUMENTS 8,614,110 B1 * 12/2013 Waters ................ B81C 1/00142
257/E23.002
2018/0044168 A1 * 2/2018 Tocchio .............. B81C 1/00246
2020/0209615 A1 * 7/2020 Lee ..................... B81C 1/00404

* cited by examiner

*Primary Examiner* — Elmito Breval
(74) *Attorney, Agent, or Firm* — KILPATRICK TOWNSEND & STOCKTON LLP

(57) ABSTRACT

In one example, a method of fabricating a polygon assembly of a Light Detection and Ranging (LiDAR) module is provided. The method comprises: forming, on a backside surface of a first silicon-on-insulator (SOI) substrate, a multi-facet polygon of the polygon assembly; forming, on a frontside surface of the first SOI substrate, an axial portion of a support structure of the polygon assembly, the axial portion forming a stack with the polygon along a rotation axis; forming, on a frontside surface of a second SOI substrate, a plurality of radial portions of the support structure; forming, on a backside surface of the second SOI substrate, a cavity that encircles the plurality of radial portions; and bonding, based on a wafer bonding operation, the axial portion to the plurality of radial portions to form the polygon assembly.

20 Claims, 24 Drawing Sheets

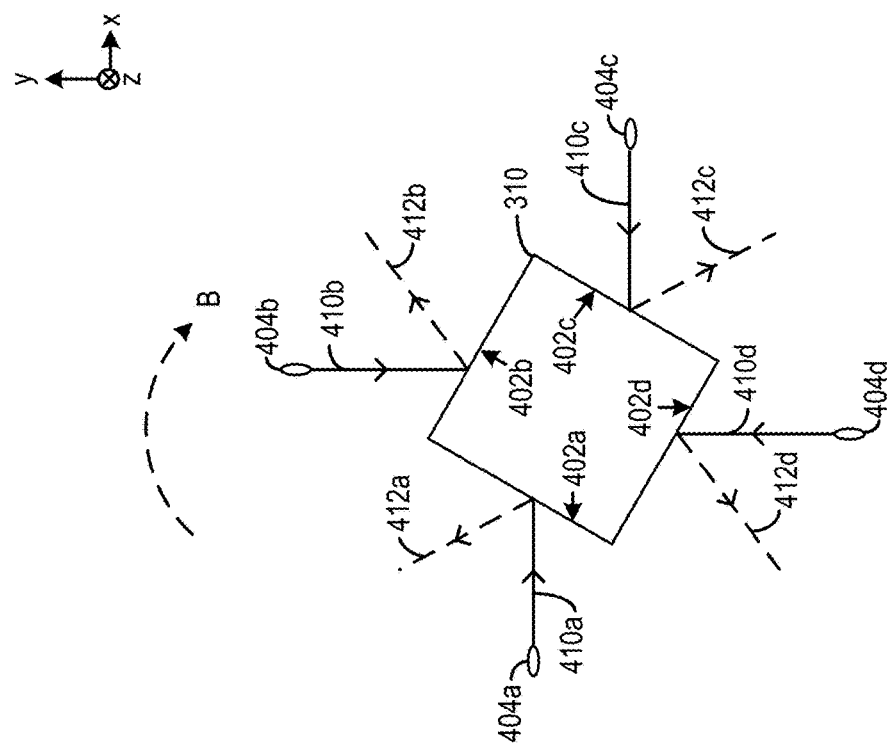
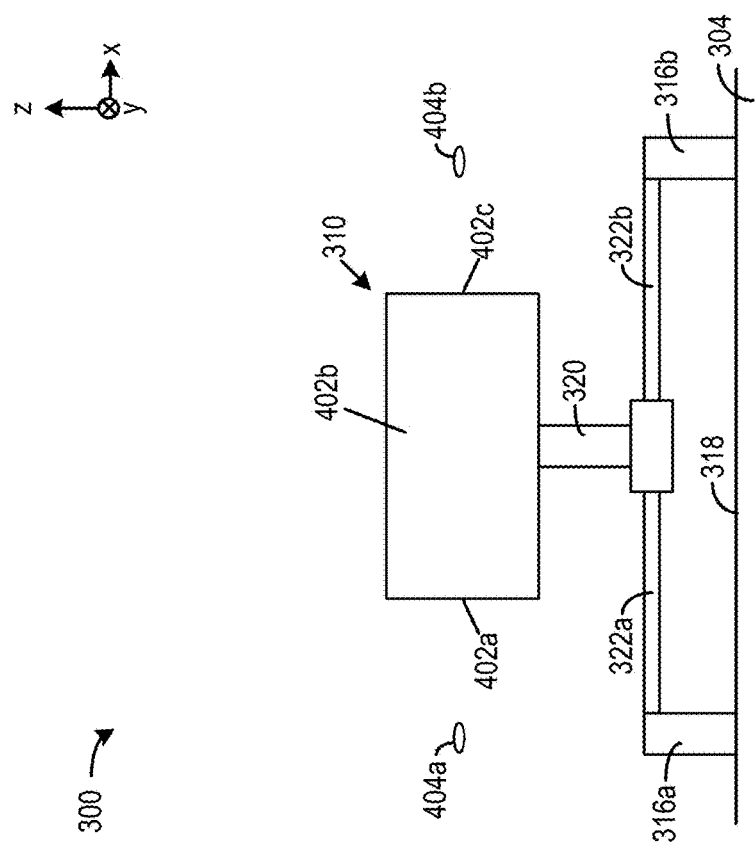
FIG. 4A

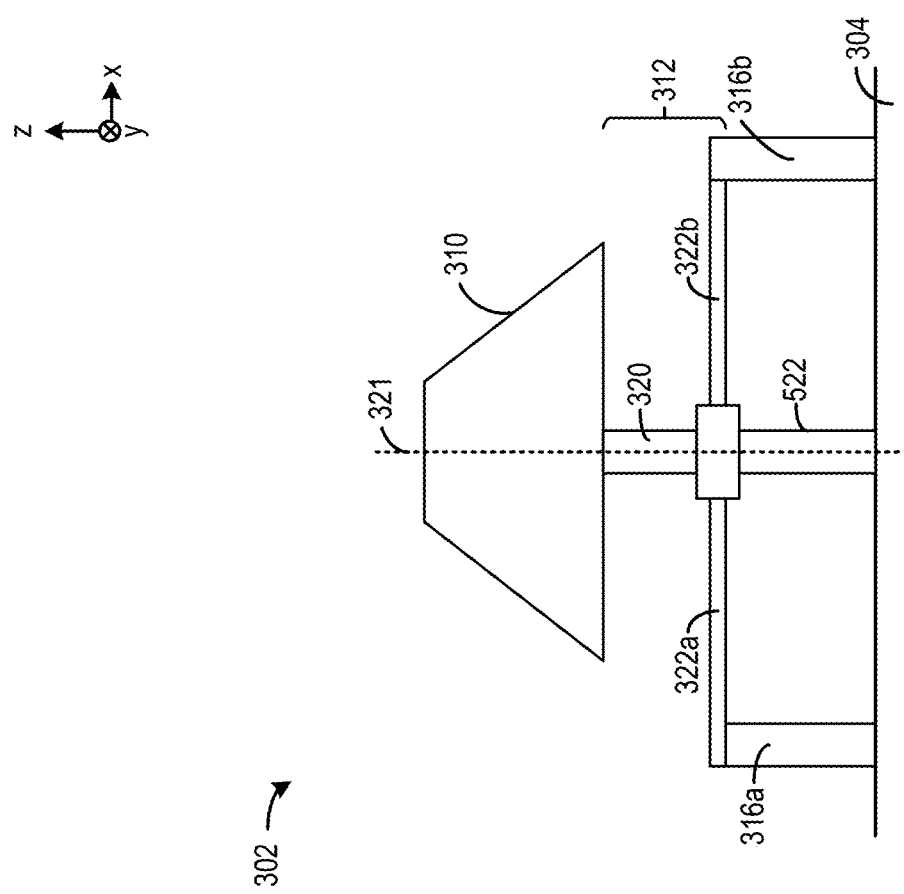

600

602 — Determining a target rotation angle of a polygon around a rotation axis, the polygon being part of a polygon assembly of a microelectromechanical system (MEMS) formed on a semiconductor substrate, the polygon assembly further comprising a support structure connected to the polygon and forming a stack with the polygon along the rotation axis, a plurality of anchors formed on the surface of the substrate, and a plurality of actuators, each actuator of the plurality of actuators being connected between the support structure and an anchor of the plurality of actuator

604 — Determining a voltage based on the target rotation angle

606 — Applying the voltage across each actuator of the plurality of actuators, wherein the voltage causes each actuator to exert a torque on the support structure to rotate the polygon around the rotation axis by the target rotation angle

FIG. 6

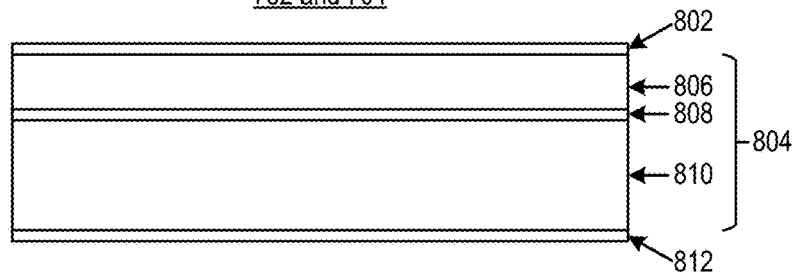
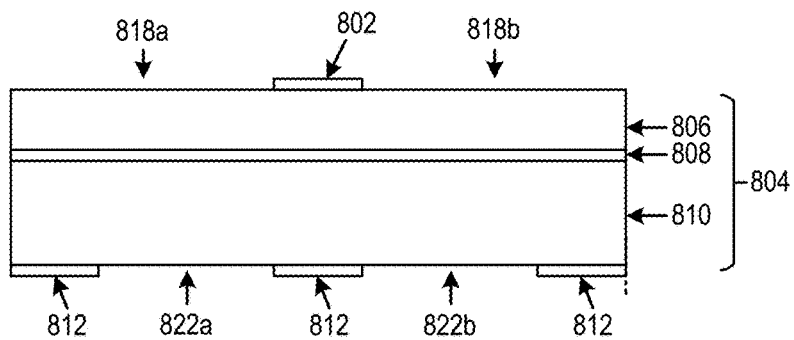
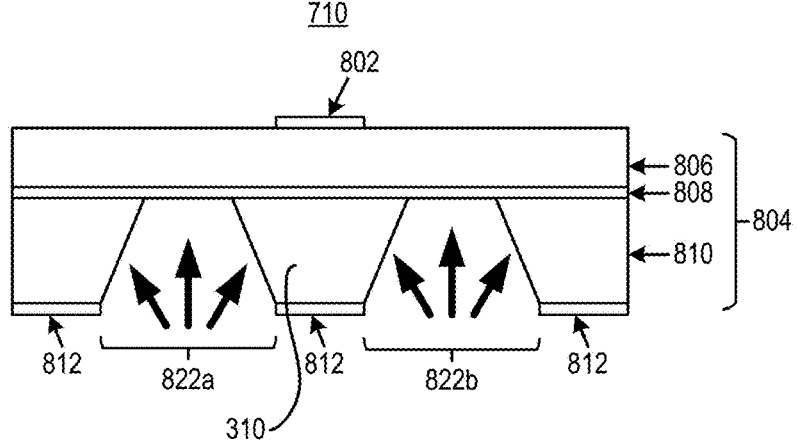
FIG. 8A

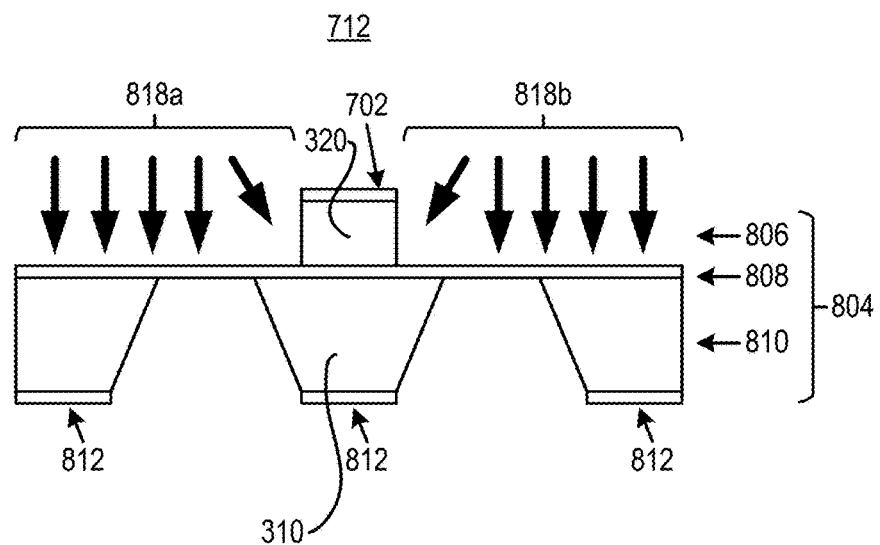
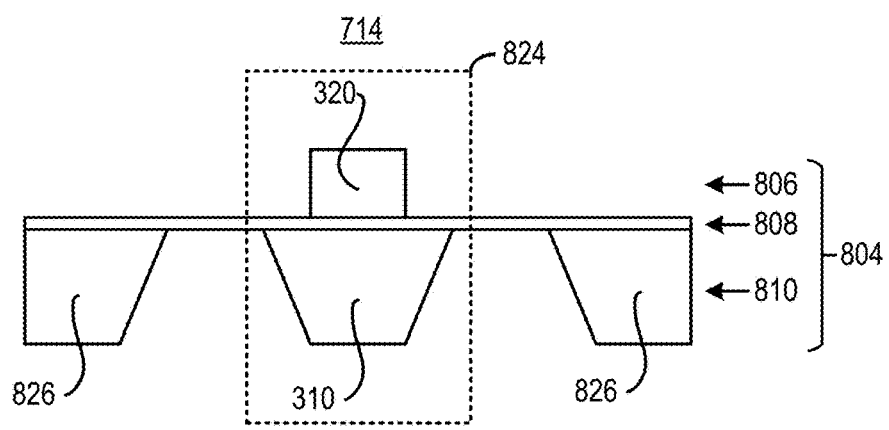
FIG. 8B

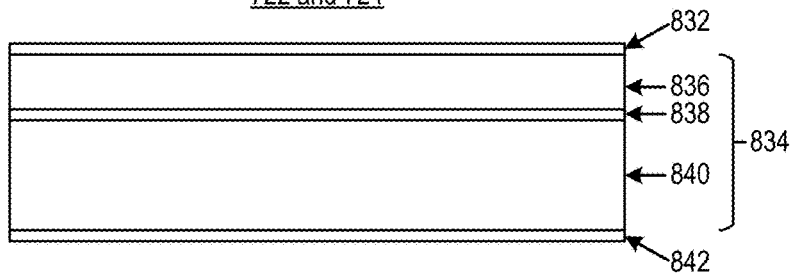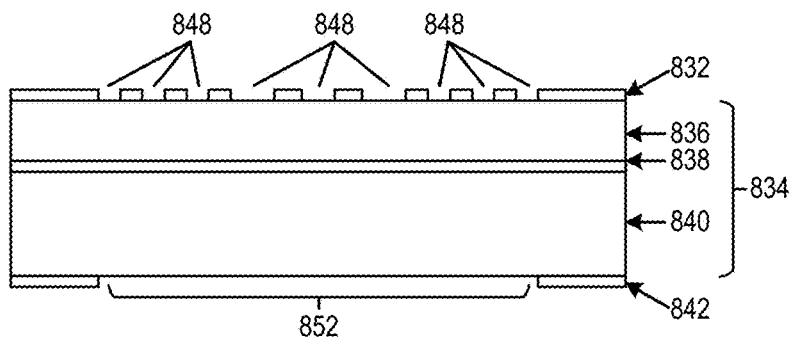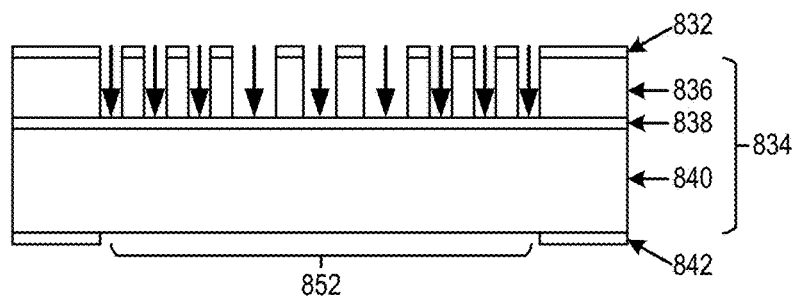
FIG. 8C

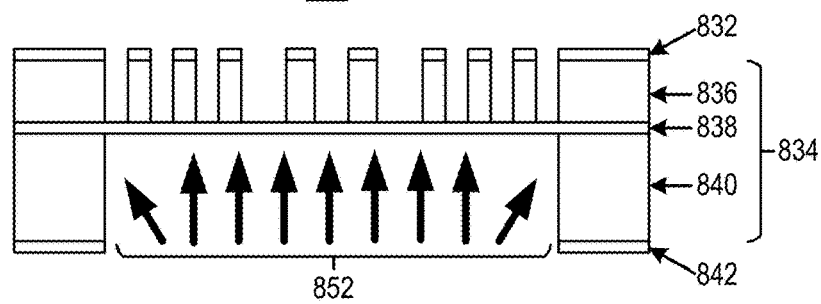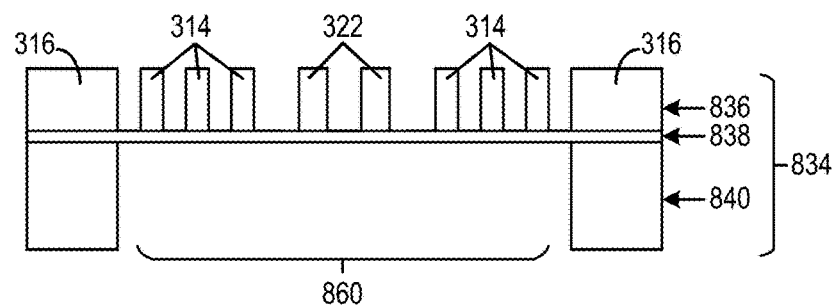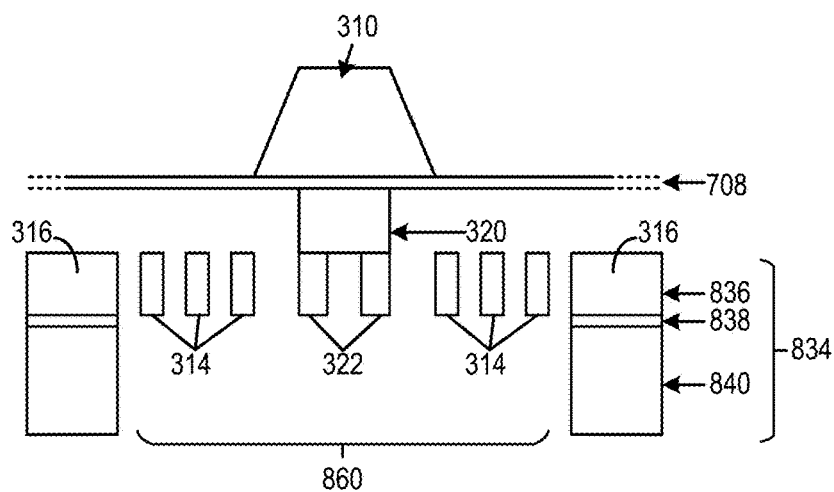
FIG. 8D

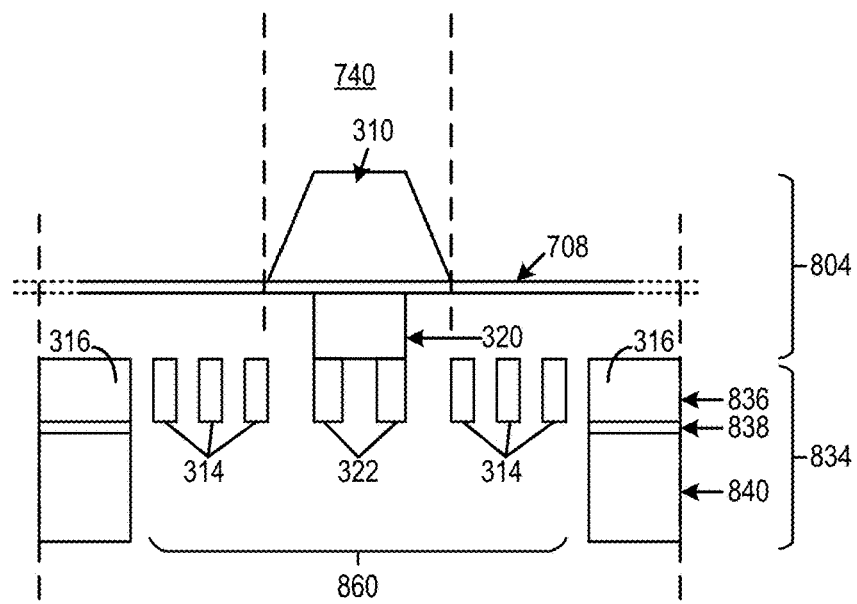
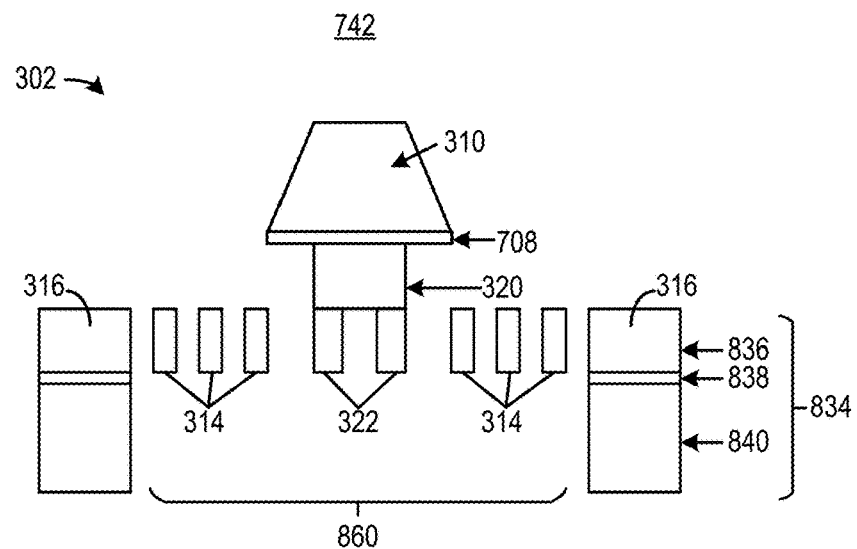
FIG. 8E

METHOD OF FABRICATING SOLID-STATE LIGHT STEERING SYSTEM

RELATED APPLICATION

The following two U.S. patent applications listed below (which include the present application) are being filed concurrently, and the entire disclosure of the other application is hereby incorporated by reference into this application for all purposes:

Application Ser. No. 17/135,902, filed Dec. 28, 2020, and entitled "SOLID-STATE LIGHT STEERING SYSTEM";

Application Ser. No. 17/135,903, filed Dec. 28, 2020, and entitled "METHOD OF FABRICATING SOLID-STATE LIGHT STEERING SYSTEM".

BACKGROUND

Light steering typically involves the projection of light in a predetermined direction to facilitate, for example, the illumination and scanning of a scene, the detection and ranging of one or more objects in the scene, or the like. Light steering can be used in many different fields of applications including, for example, light detection and ranging (LiDAR) system of a vehicle, medical imaging, etc.

Light steering can be performed in both transmission and reception of light. For example, a light steering transmitter may control the projection direction of light to detect/image an object. Moreover, a light steering receiver may select a direction of incident light to be detected by the receiver, to avoid detecting other unwanted signals.

The performance of a light steering system can be evaluated based on various metrics, such as field of view (FOV). The FOV can define the extent of a scene to be detected/illuminated by the light steering system. In a case where the light steering system is part of a LiDAR system of a vehicle, it is desirable that the light steering transmitter can provide a 360-degree horizontal FOV so as to project light and to detect objects in all directions around the vehicle, and to avoid blind spots in the object detection operations.

BRIEF SUMMARY

In some examples, an apparatus is provided. The apparatus is part of a Light Detection and Ranging (LiDAR) module of a vehicle. The apparatus comprises: a semiconductor integrated circuit comprising a micro-electromechanical system (MEMS) formed on a surface of a silicon substrate, and a controller, the MEMS comprising a polygon assembly, the polygon assembly comprising: a polygon; a support structure connected to the polygon and forming a stack with the polygon along a rotation axis; a plurality of anchors formed on the surface of the substrate; and a plurality of actuators, each actuator of the plurality of actuators being connected between the support structure and an anchor of the plurality of actuators. The controller is configured to: determine a target rotation angle of the polygon around the rotation axis; determine a voltage based on the target rotation angle; and apply the voltage across each actuator of the plurality of actuators, wherein the voltage causes each actuator to exert a torque on the support structure to rotate the polygon around the rotation axis by the target rotation angle to reflect light emitted by a light source out of the LiDAR module or to reflect light received by the LiDAR module to a receiver.

In some aspects, the polygon includes facets that are perpendicular to the surface of the substrate to reflect the light.

In some aspects, the apparatus further comprises at least one of the light source and the receiver positioned adjacent to the polygon.

In some aspects, the polygon includes facets that are tilted with respect to the surface of the substrate to reflect the light.

In some aspects, the facets are tiled with respect to the surface of the substrate by a tilting angle based on a crystallographic orientation of the silicon substrate.

In some aspects, the apparatus further comprises at least one of the light source and the receiver positioned in a space above the polygon.

In some aspects, the apparatus further comprises a plurality of optic fibers configured to: generate collimated light rays from the light source; and project the collimated light rays towards one or more of the facets, to enable the one or more of the facets to reflect the collimated light rays.

In some aspects, the apparatus further comprises an optical coupler configured to: receive the collimated light rays from the plurality of optical fibers; and project the collimated light rays onto the one or more of the facets at an incident angle to enable the one or more of the facets to reflect the collimated light rays along an axis perpendicular to the rotation axis.

In some aspects, the support structure comprises an axial portion and a plurality of radial portions that extends from the axial portion. The axial portion forms the stack with the polygon along the rotation axis. Each actuator is connected across one end of a radial portion of the plurality of radial portions and an anchor of the plurality of anchors.

In some aspects, the plurality of anchors is a plurality of first anchors. The apparatus further includes a plurality of second anchors formed on the surface of the substrate. Each second anchor of the plurality of second anchors is connected to the one end of the radial portion of the plurality of radial portions via an elastic connection structure.

In some aspects, the elastic connection structure has a first degree of spring stiffness along a radial direction and a second degree of spring stiffness along a tangential direction. The first degree of spring stiffness is higher than the second degree of spring stiffness.

In some aspects, the voltage is determined based on the second degree of spring stiffness.

In some aspects, the elastic connections structure comprises at least one of: a chevron spring, a folded beam spring, or a bending spring.

In some aspects, the axial portion is connected to the surface of the substrate via an elastic connection structure. The elastic connection structure may include a torsional bar.

In some aspects, each of the plurality of actuators comprises at least one of: an electrostatic actuator, an electromagnetic actuator, or a piezoelectric actuator. The electrostatic actuator may include a pair of angular comb drives.

In some examples, a method is provided. The method comprises: determining a target rotation angle of a polygon around a rotation axis, the polygon being part of a polygon assembly of a micro-electromechanical system (MEMS) formed on a semiconductor substrate, the polygon assembly further comprising a support structure connected to the polygon and forming a stack with the polygon along the rotation axis, a plurality of anchors formed on the surface of the substrate, and a plurality of actuators, each actuator of the plurality of actuators being connected between the support structure and an anchor of the plurality of actuator; determining a voltage based on the target rotation angle; and applying the voltage across each actuator of the plurality of actuators, wherein the voltage causes each actuator to exert a torque on the support structure to rotate the polygon around the rotation axis by the target rotation angle.

In some aspects, the polygon includes facets that are tilted with respect to the surface of the substrate to reflect light.

In some examples, a non-transitory computer readable medium storing instructions that, when executed by a controller, causes the controller to perform: determining a target rotation angle of a polygon around a rotation axis, the polygon being part of a polygon assembly of a microelectromechanical system (MEMS) formed on a semiconductor substrate, the polygon assembly further comprising a support structure connected to the polygon and forming a stack with the polygon along the rotation axis, a plurality of anchors formed on the surface of the substrate, and a plurality of actuators, each actuator of the plurality of actuators being connected between the support structure and an anchor of the plurality of actuator; determining a voltage based on the target rotation angle; and applying the voltage across each actuator of the plurality of actuators, wherein the voltage causes each actuator to exert a torque on the support structure to rotate the polygon around the rotation axis by the target rotation angle.

In some examples, a method of fabricating a polygon assembly of a Light Detection and Ranging (LiDAR) module is provided. The method comprises: forming, on a backside surface of a first silicon-on-insulator (SOI) substrate, a multi-facet polygon of the polygon assembly; forming, on a frontside surface of the first SOI substrate, an axial portion of a support structure of the polygon assembly, the axial portion forming a stack with the polygon along a rotation axis; forming, on a frontside surface of a second SOI substrate, a plurality of radial portions of the support structure; forming, on a backside surface of the second SOI substrate, a cavity that encircles the plurality of radial portions; and bonding, based on a wafer bonding operation, the axial portion to the plurality of radial portions to form the polygon assembly.

In some aspects, the method further comprises: depositing a first layer of photoresist on the frontside surface of the first SOI substrate; patterning the first layer of photoresist to create first openings; and performing a first etching process through the first openings to fabricate the axial portion.

In some aspects, the first etching process comprises an anisotropic etching process.

In some aspects, the first etching process comprises a deep reactive-ion (DRIE) etching process.

In some aspects, the first etching process stops upon reaching an insulator layer of the first SOI substrate.

In some aspects, the method further comprises: depositing a second layer of photoresist on the backside surface of the first SOI substrate; patterning the second layer of photoresist to create second openings; and performing a second etching process through the second openings to fabricate the multi-facet polygon.

In some aspects, the second etching process comprises an anisotropic etching process.

In some aspects, the second etching process comprises an anisotropic wet etching process to fabricate the polygon having tilted facets.

In some aspects, the second etching process comprises a DRIE etching process to fabricate the polygon having vertical facets.

In some aspects, the second etching process stops upon reaching an insulator layer of the first SOI substrate.

In some aspects, the method further comprises: depositing a third layer of photoresist on the frontside surface of the second SOI substrate; patterning the third layer of photoresist to create third openings; and performing a third etching process through the first openings to fabricate the plurality of radial portions.

In some aspects, the third etching process is performed through the first openings to further fabricate a plurality of first anchors, a plurality of actuators that connect between the plurality of first anchors and the plurality of radial portions, a plurality of second anchors, and a plurality of connection structures connected between the plurality of radial portions and the plurality of second anchors.

In some aspects, the third etching process comprises an anisotropic etching process.

In some aspects, the third etching process comprises a deep reactive-ion (DRIE) etching process.

In some aspects, the third etching process stops upon reaching an insulator layer of the second SOI substrate.

In some aspects, the method further comprises: depositing a fourth layer of photoresist on the backside surface of the second SOI substrate; patterning the fourth layer of photoresist to create a fourth opening; and performing a fourth etching process through the fourth opening to fabricate the cavity.

In some aspects, the fourth etching process removes a portion of the insulator layer underneath the plurality of radial portions, the plurality of actuators, and the plurality of connection structures.

In some aspects, the wafer bonding operation comprises aligning the axial portion and a center of the plurality of radial portions.

In some aspects, the aligning is based on measuring a degree of alignment between first alignment markings on the frontside surface of the first SOI substrate and second alignment markings on the frontside surface of the second SOI substrate. The wafer bonding operation comprises a pre-bonding operation followed by an annealing operation.

In some examples, a polygon assembly of a Light Detection and Ranging (LiDAR) module fabricated by a process comprising: forming, on a backside surface of a first silicon-on-insulator (SOI) substrate, a multi-facet polygon of the polygon assembly; forming, on a frontside surface of the first SOI substrate, an axial portion of a support structure of the polygon assembly, the axial portion forming a stack with the polygon along a rotation axis; forming, on a frontside surface of a second SOI substrate, a plurality of radial portions of the support structure; forming, on a backside surface of the second SOI substrate, a cavity that encircles the plurality of radial portions; and bonding, based on a wafer bonding operation, the axial portion to the plurality of radial portions to form the polygon assembly.

BRIEF DESCRIPTION OF THE DRAWINGS

The detailed description is set forth with reference to the accompanying figures.

FIG. 4A, FIG. 4B, FIG. 4C, and FIG. 4D illustrate additional examples of a solid-state light steering system, according to examples of the present disclosure.

FIG. 5A, FIG. 5B, FIG. 5C, FIG. 5D, and FIG. 5E illustrate additional examples of a solid-state light steering system, according to examples of the present disclosure.

FIG. 6 illustrates a method of operating a solid-state light steering system according to examples of the present disclosure.

FIG. 7A, FIG. 7B, FIG. 8A, FIG. 8B, FIG. 8C, FIG. 8D, and FIG. 8E illustrate examples of fabrication processes to fabricate a solid-state light steering system; according to examples of the present disclosure.

DETAILED DESCRIPTION

Figure 1A:
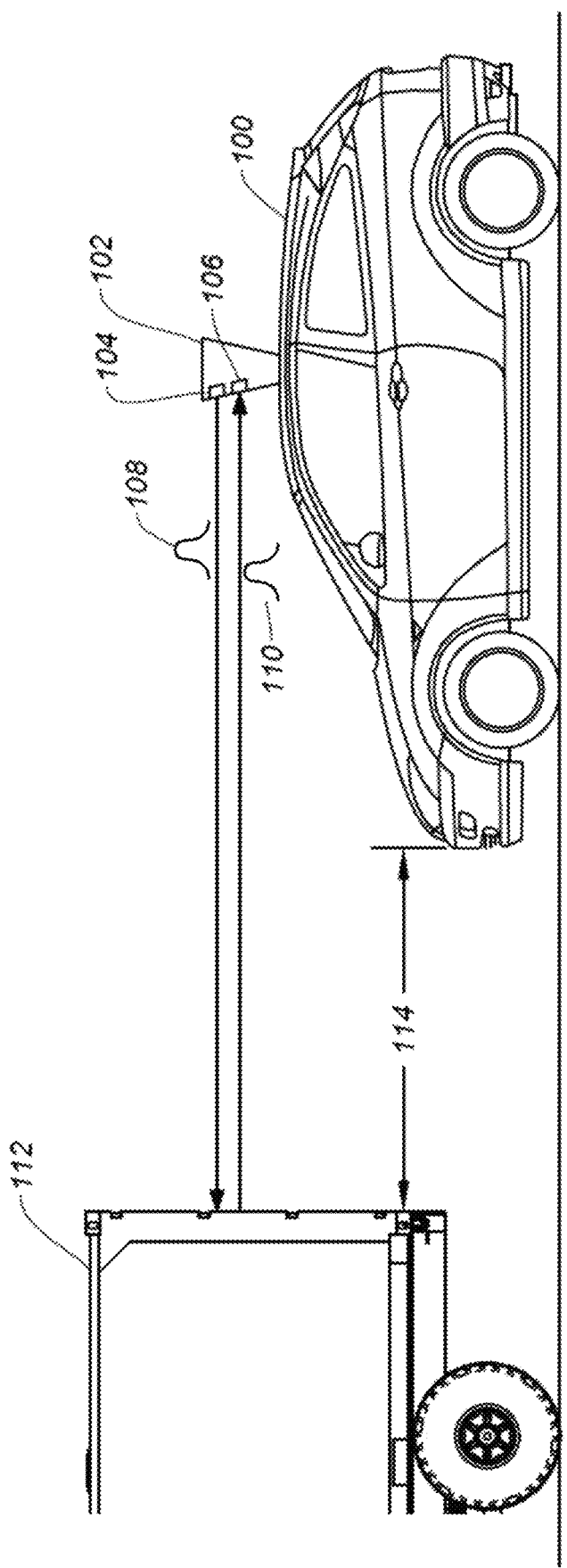
FIG. 1A and FIG. 1B show an autonomous driving vehicle and a light steering system utilizing aspects of certain examples of the disclosed techniques herein.

In the following description, various examples of a solid-state polygon assembly will be described. For purposes of explanation, specific configurations and details are set forth to provide a thorough understanding of the examples. However, it will be apparent to one skilled in the art that certain examples may be practiced or implemented without every detail disclosed. Furthermore, well-known features may be omitted or simplified to prevent any obfuscation of the novel features described herein.

Light steering can be found in different applications. For example, a Light Detection, and Ranging (LiDAR) module of a vehicle may include a light steering system. The light steering system can be part of the transmitter of the LiDAR module to steer light towards different directions to illuminate objects around the vehicle. The light steering system can also be part of the receiver of the LiDAR module to steer light reflected by the objects from different directions to the receiver. Based on a time difference between the transmitted and reflected signals, distances between the obstacles and the vehicle can be determined. The detection and ranging operations can provide information to assist a driver and/or to support autonomous driving.

The performance of a light steering system can be evaluated based on various metrics, such as field of view (FOV). The FOV can define the extent of a scene to be detected/illuminated by the light steering system. In a case where the light steering system is part of a LiDAR system of a vehicle, it is desirable that the light steering transmitter can provide a 360-degree horizontal FOV so as to project light and to detect objects in all directions around the vehicle, and to avoid blind spots in the object detection operations. Specifically, if the LiDAR system can only provide a less than 360-degree horizontal FOV, objects in parts of the scene that are outside the FOV may become undetected by the LiDAR module. The undetected objects can pose dangers to the operation of the vehicle.

Various techniques exist to implement a light steering system having a 360-degree horizontal FOV, but they can have shortcomings which can degrade the overall performance of the light steering system. One example is a mechanical polygon assembly, which can include a multi-facet polygon with each facet forming a mirror, and a motor mounted below the polygon to support and rotate the polygon. To perform a scanning operation, the motor can be controlled according to a scanning pattern, in which the polygon is rotated by specific angles at different times, to enable each facet to reflect light to different locations in the surroundings of the mechanical polygon assembly. The FOV provided by each facet of the polygon can be combined to provide an aggregate 360-degree FOV without the motor rotating the polygon by a full 360 degrees.

But a mechanical polygon assembly can have reliability and precision issues which can degrade its overall performance. Specifically, the polygon is typically made of metal to provide smooth and polishable light reflecting surfaces, which makes it bulky and heavy. As the motor needs to support the heavy weight of the polygon, various mechanical parts that connect the polygon to the motor, such as bearings, shaft, can be subject to substantial wear and tear, which can reduce the lifetime and the reliability of the mechanical polygon assembly. The wear and tear, and the resulting reliability degradation, can be further exacerbated when the motor rotates the polygon at a high speed to scan through the 360-degree FOV at a particular scanning frequency, in order to provide the vehicle with updated information about its surrounding. The bulky and heavy polygon can also introduce precision issues. Specifically, it may be challenging to balance and align the bulky polygon on the motor. An unbalanced or misaligned polygon can cause light to be reflected to unintended directions. Combined with other physical challenges posed by the polygon assembly (e.g., frictions, moment of inertia, etc.), it becomes difficult to control the polygon to reflect light towards specific directions according to the scanning pattern. As a result, imprecision can be introduced to the scanning operation. All these can degrade the optical performance of the mechanical polygon assembly.

Besides mechanical polygon assemblies, a micro-electro-mechanical system (MEMS) implemented on a semiconductor substrate can also provide light steering function. For example, a solid-state light steering system can include an array of micro-mirror assemblies implemented on a semiconductor substrate. Each micro-mirror assembly can include, a micro-mirror, and an actuator. The can be rotatable by the actuator over a rotation axis parallel with the substrate's surface. Compared with a mechanical polygon assembly, a micro-mirror is light weight, and can be controlled to rotate at a high speed, and by pre-determined angles with a high precision. Moreover, as the micro-mirror and the actuator are typically fabricated on a semiconductor substrate as a unitary structure, rather than being assembled together as separate moving parts, the imprecise alignment and balancing issues associated with mechanical polygon assemblies can be avoided or at least mitigated. All these can improve the performance of the light steering system.

Although micro-mirror assemblies can provide improved performance, they also have limitations that can degrade the performance of the light steering system. Specifically, as a micro-mirror can only rotate over a limited range of angles and cannot rotate by 360 degrees, an array of micro-mirrors cannot provide a 360-degree FOV. To achieve a 360-degree FOV, a LiDAR system can include multiple arrays of micro-mirrors each facing a different direction. Each array of micro-mirrors can be controlled to rotate by the same angle to mimic the movements of the different facets of a polygon. The FOVs of each array of micro-mirrors can be combined to achieve the 360-degree FOV. But such arrangements require synchronization among the multiple arrays of micro-mirrors, as well as among the micro-mirrors within the same array, to ensure that the micro-mirrors rotate by the same target rotation angle. Mismatches in the rotation angles among the micro-mirrors within an array can cause dispersions in the reflected light, which reduces the resolution of the scanning operation. Moreover, due to mismatches in the rotation angles among the arrays of micro-mirrors, the LiDAR system may be unable to project light to a certain directions within the scanning operation, which can lead to blind spots. All these can degrade the performance of the light steering system.

Conceptual Overview of Certain Examples

Figure 3A:
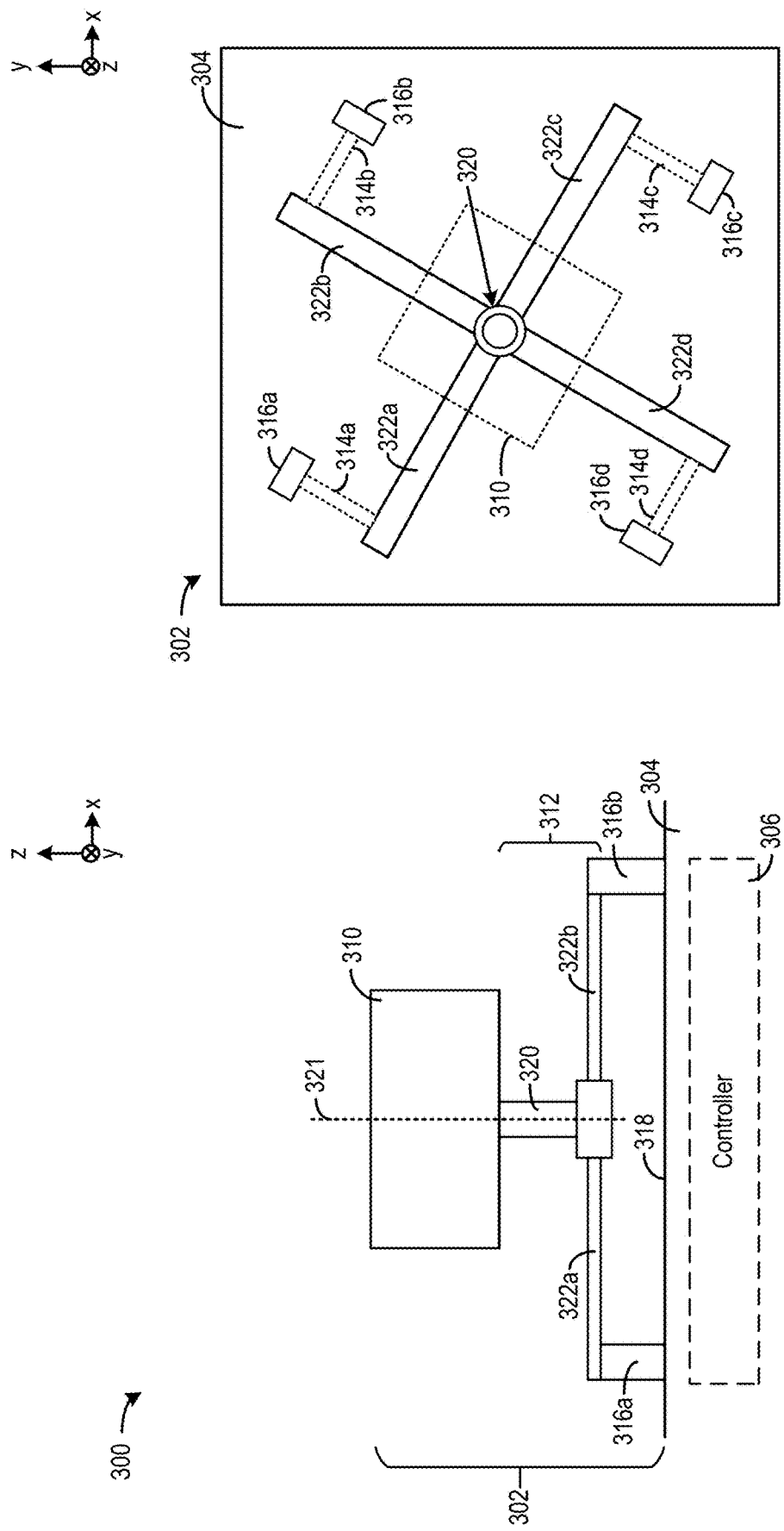
FIG. 3A and FIG. 3B illustrate examples of a solid-state light steering system, according to examples of the present disclosure.

Examples of the present disclosure relate to a solid-state light steering system that can address the problems described above. Various examples of the solid-state light steering system are shown in FIG. 3A-FIG. 5E. As shown in FIG. 3A, a solid-state light steering system can include a MEMS implemented on a silicon substrate, as well as a controller formed in the silicon substrate. The MEMS can include a polygon, a support structure, actuators, and anchors; all of which can be fabricated from silicon wafers, such as single silicon crystal wafers. A typical dimension of the polygon can be in the order of millimeters. The support structure can include an axial portion and a plurality of radial portions, and can be connected to the substrate via one or more connection structures. The polygon and the axial portion are stacked along and center around a first axis that is perpendicular to a surface of the substrate. The polygon and the axial portion are rotatable around the first axis. The one or more radial portions extend from the axial portion along a second axis parallel with the surface of the substrate and are connected with the actuators, which are in turn connected to the anchors on the surface of the substrate. The polygon can include multiple light-reflecting facets, with each facet configured to reflect light from a light source. The solid-state light steering system can be positioned such that all of the facets of the polygon face the surrounding of a vehicle.

Figure 3B:
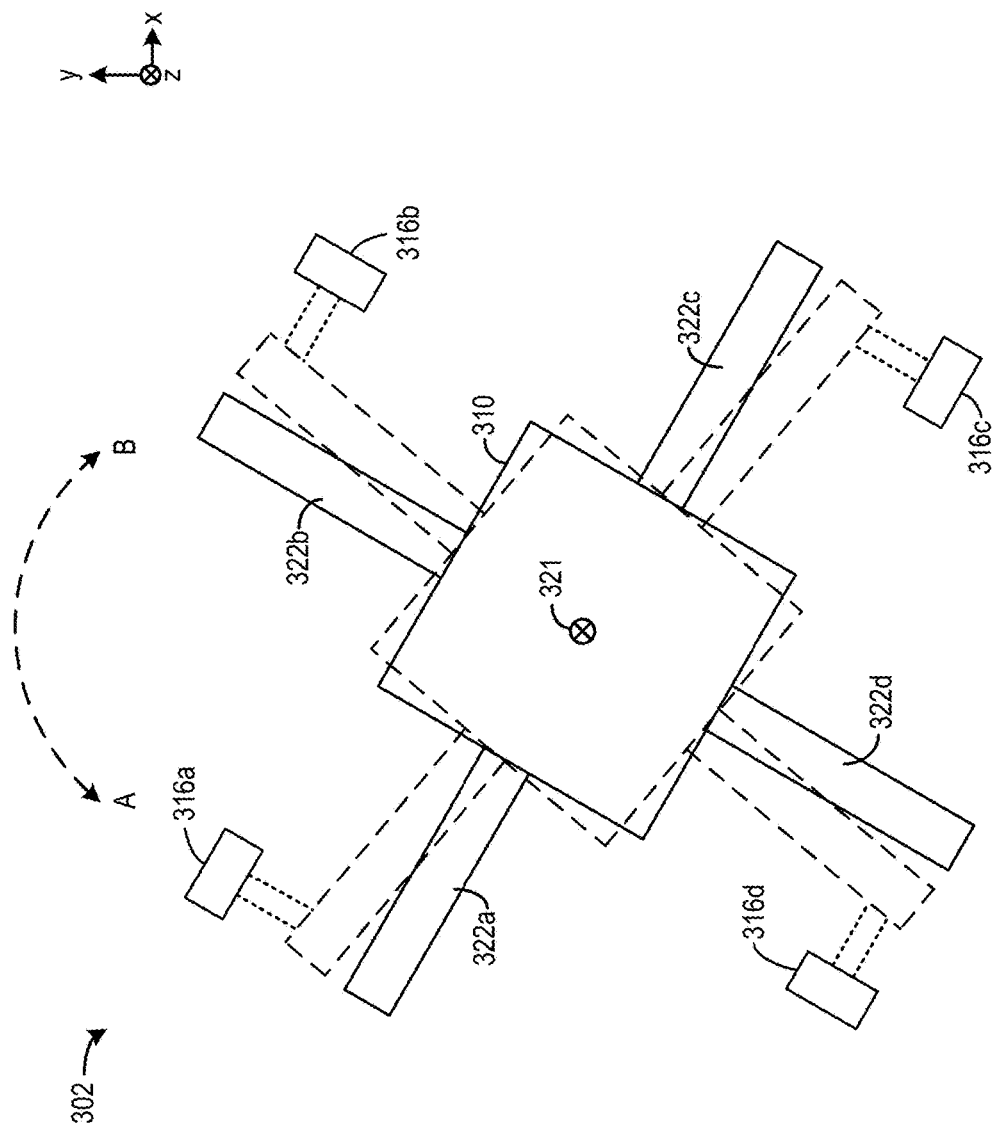

Referring to FIG. 3B, to perform a scanning operation, a controller can control the actuator to apply a torque onto the one or more radial portions to rotate the polygon according to a scanning pattern, in which the polygon is rotated by specific angles at different times, to enable each facet to reflect light to different locations in the surroundings of the mirror assembly. The FOV provided by each facet of the polygon can be combined to provide an aggregate 360-degree FOV.

Figure 4B:
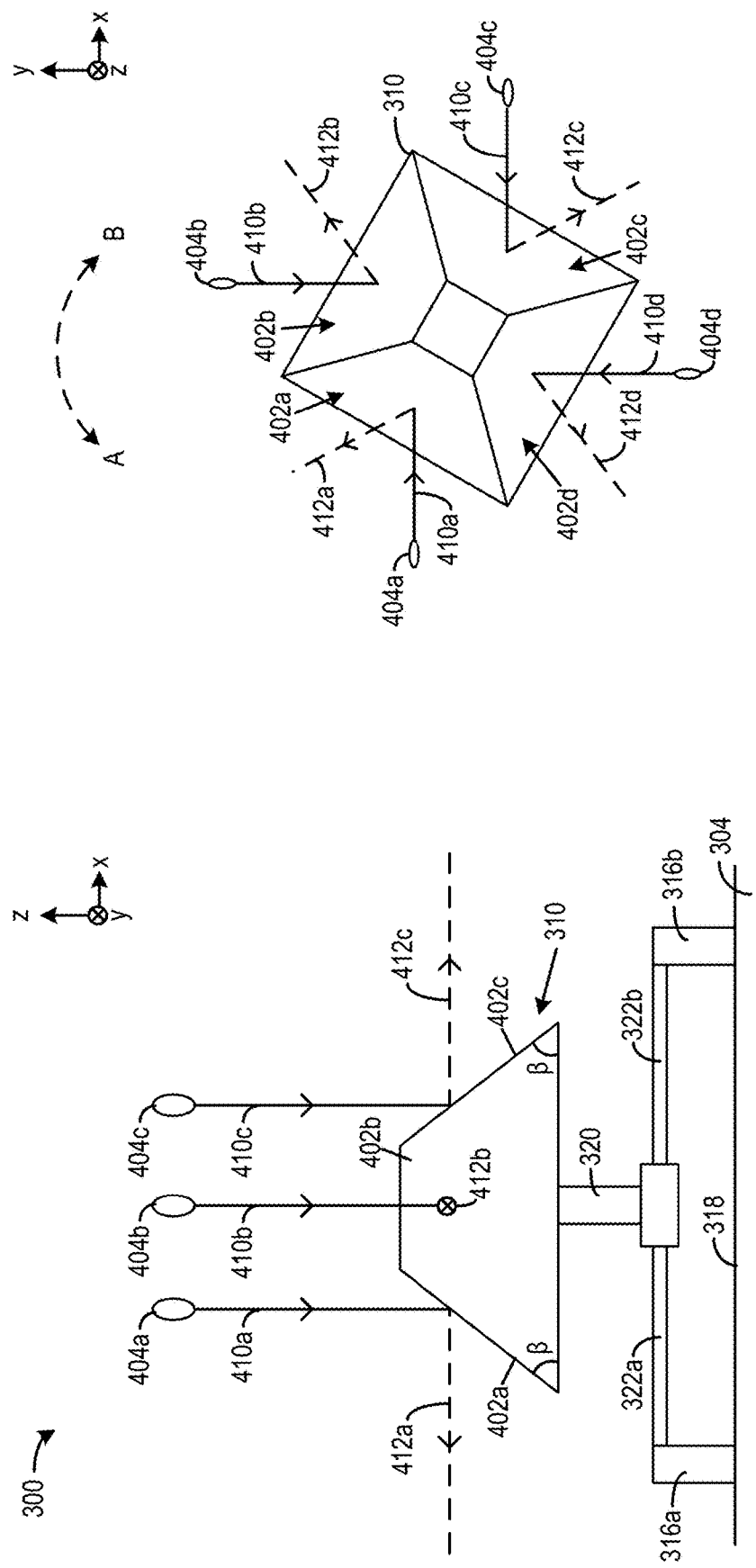
Figure 4C:
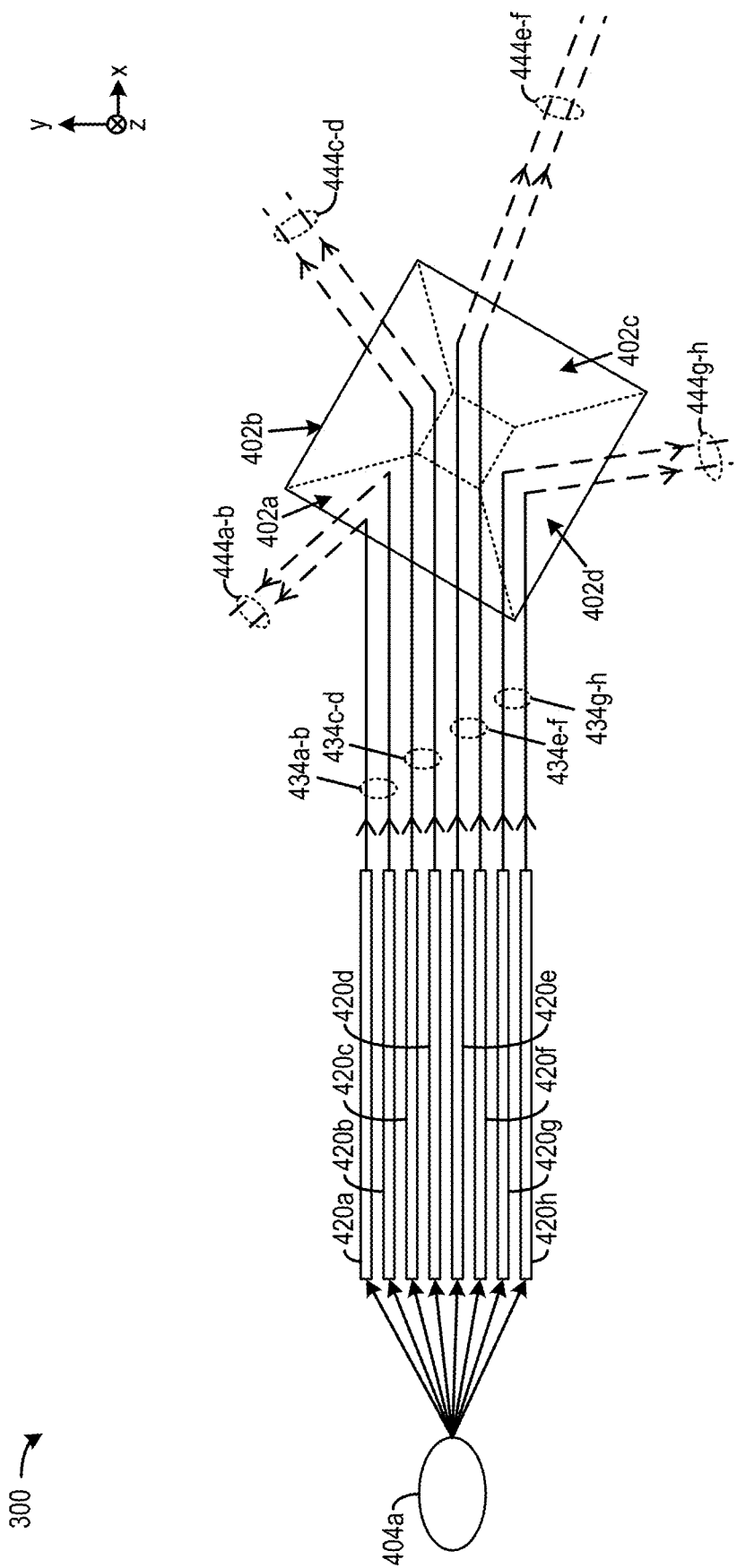
Figure 4D:
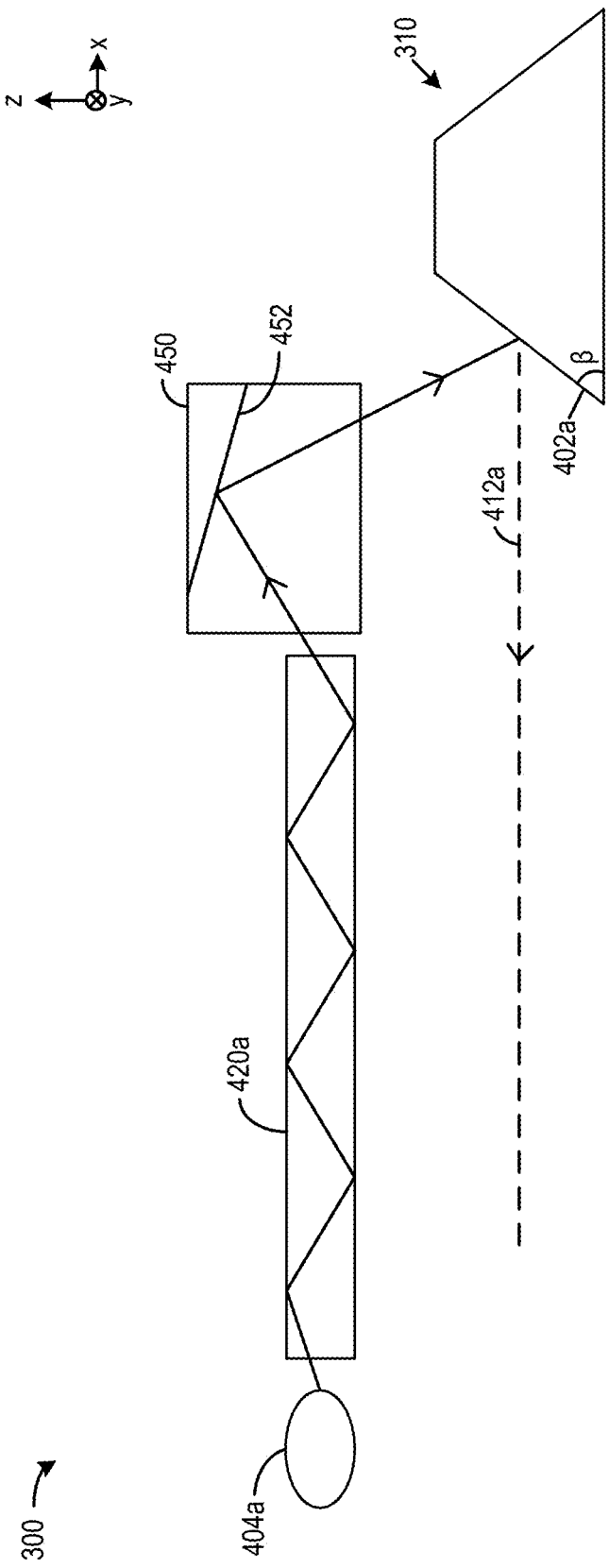

Various examples of the solid-state light steering system are proposed. As shown in FIG. 4A, in some examples the facets of the polygon can be perpendicular to substrate surface. The light sources can be positioned around the polygon along the radial directions. In some examples, as shown in FIG. 4B, the facets of the polygon can also be tilted with respect to the substrate surface. As shown in FIG. 4C, the tilted facets can reflect light from light sources positioned above the polygon outwards along a horizontal direction to provide the horizontal FOV. As the light sources do not obscure the reflective paths of the light from each facet regardless of the rotation angle and rotation direction of the polygon, the achievable FOV for each facet can be extended, and the number of facets required to achieve a 360-degree FOV can be reduced. Such arrangements can reduce the complexity of fabrication of the polygon and the solid-state light steering system. In some examples, as shown in FIG. 4D, the solid-state light steering system can include optical components, such as optical fibers and lenses configured as couplers, to guide the light from the light sources onto the tilted facets of the polygon.

Figure 5A:
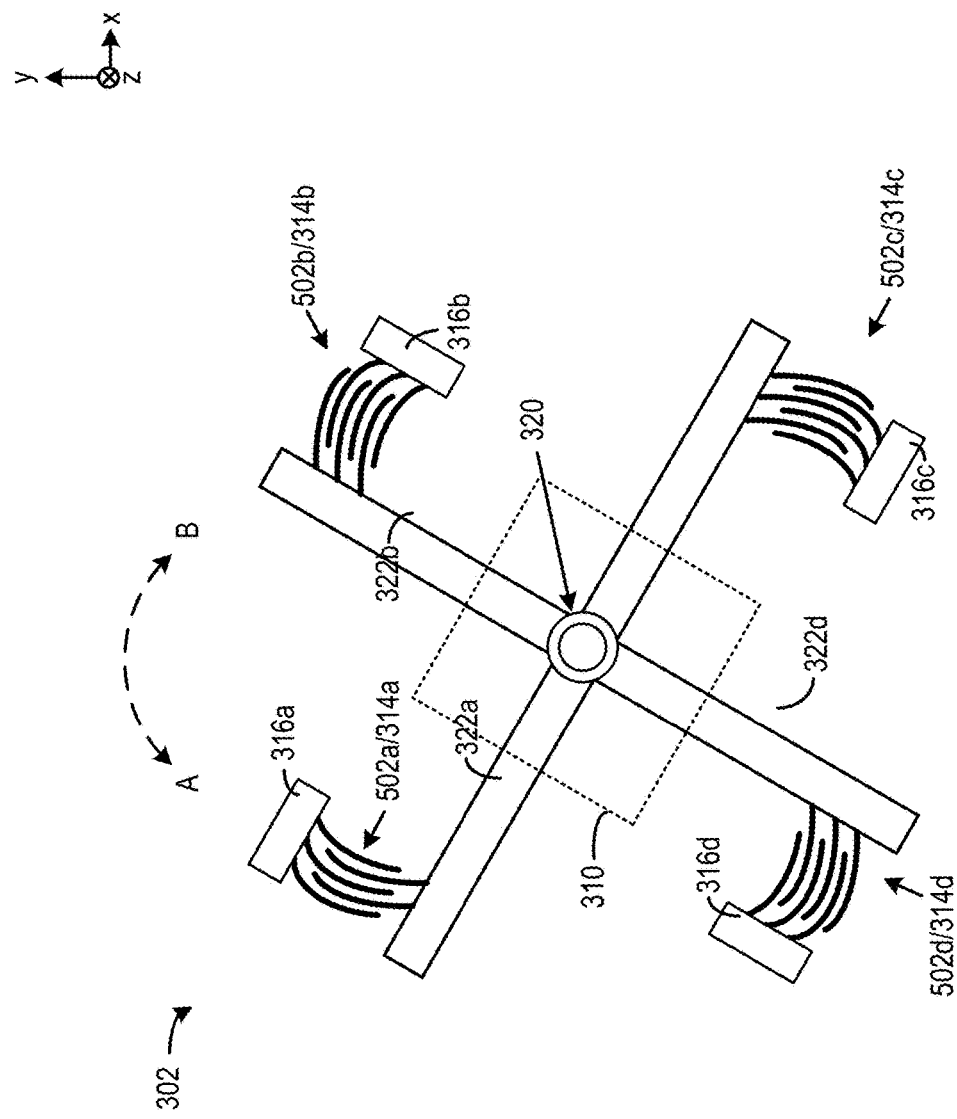

Various examples of actuator structures between the support structure and the substrate are also proposed. As shown in FIG. 5A, FIG. 5D, and FIG. 5E, the light steering system can include electrostatic actuators (e.g., angular comb drives), piezoelectric actuators, electromagnetic actuators, connected between the radial portions of the support structure and a first set of anchor structures on the substrate. The actuators can exert a torque via, for example, an electrostatic force, a mechanical force, an electromagnetic force, etc., onto the radial portions to rotate the support structure as well as the polygon.

Figure 5B:
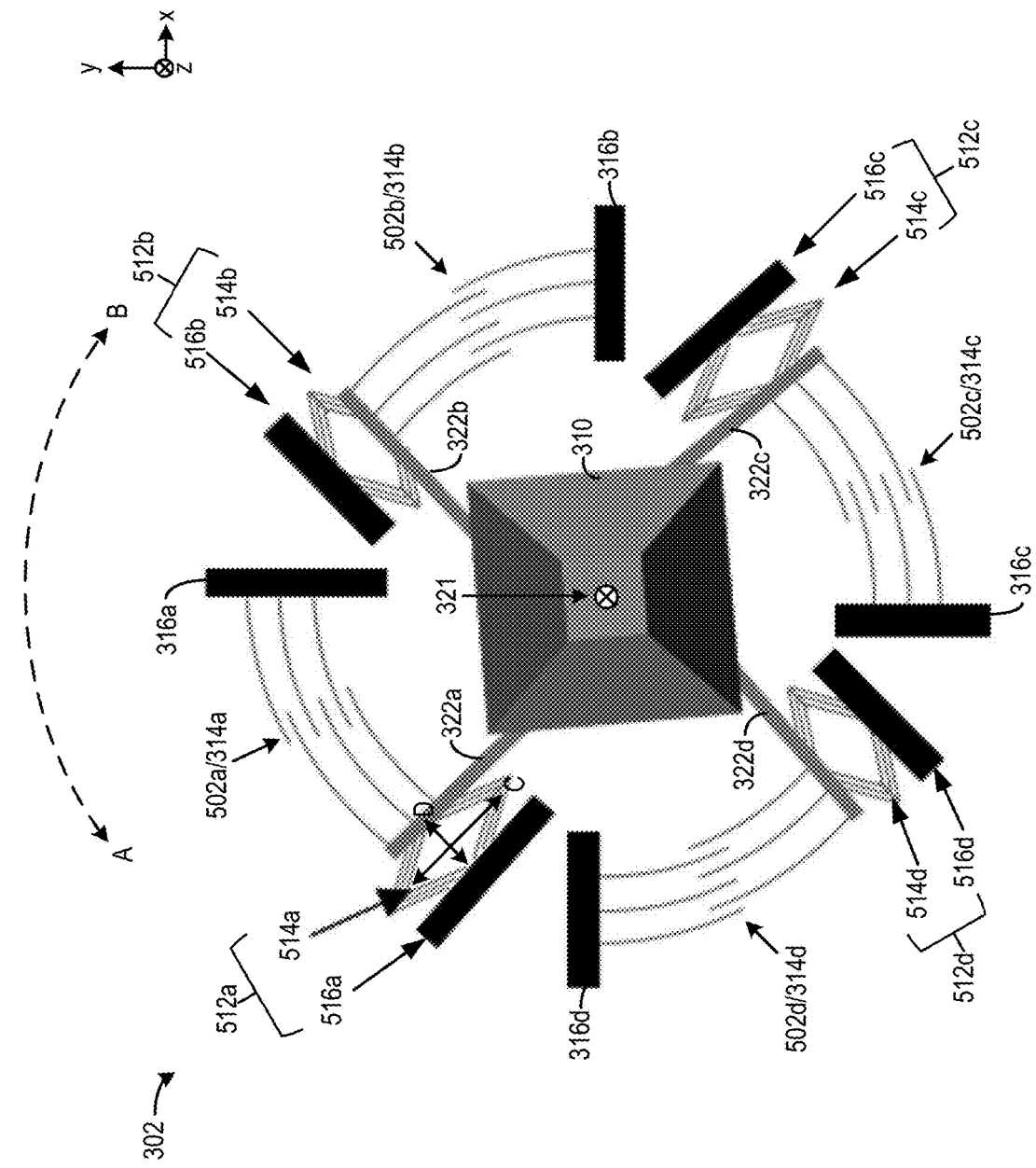
Figure 5D:
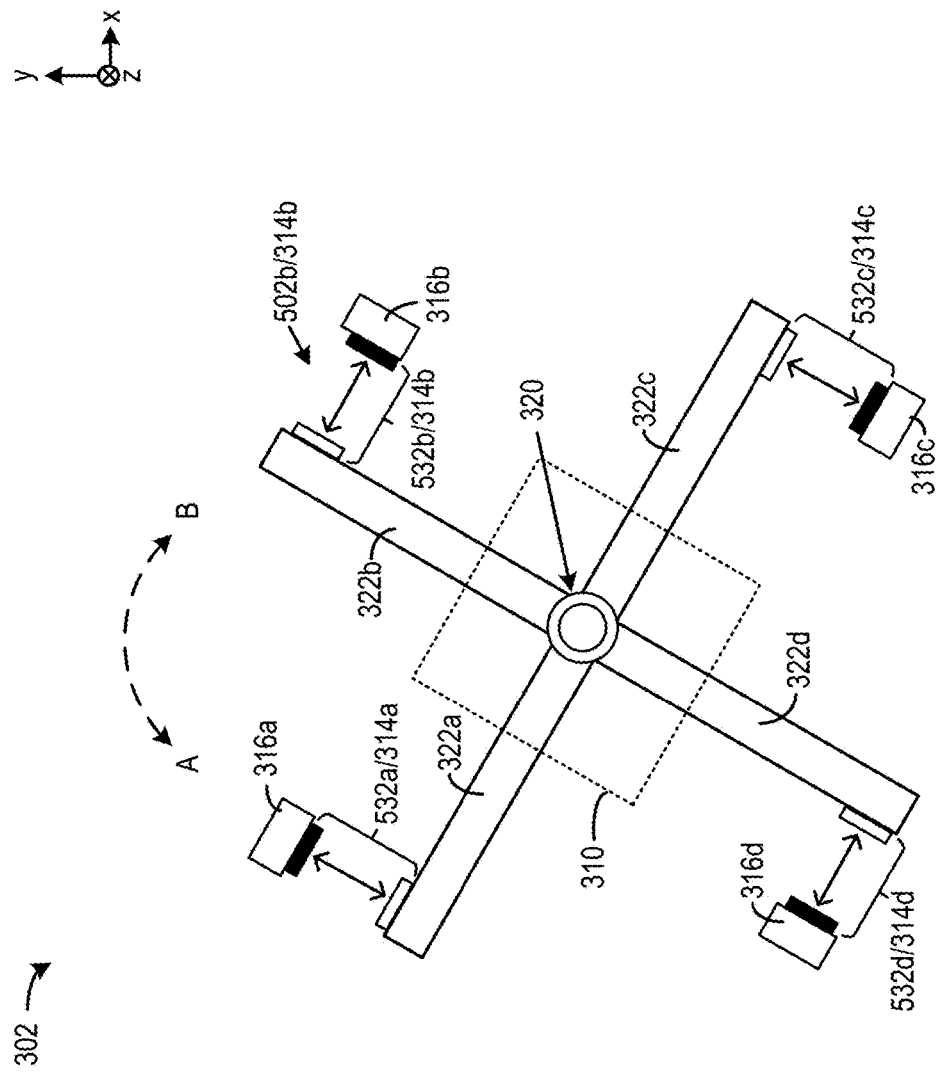
Figure 5E:
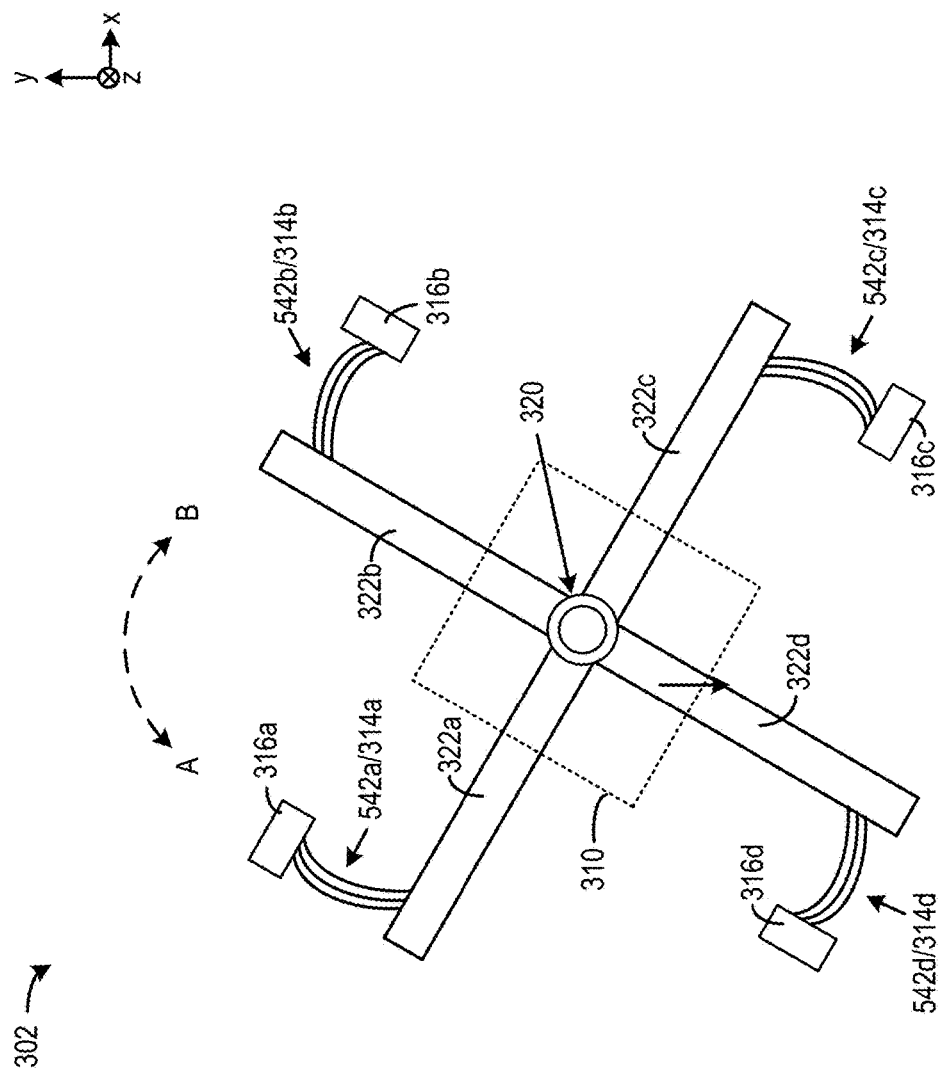

In addition, as shown in FIG. 5B, the polygon assembly may include connection structures that connect the radial portions of the support structure to a second set of anchor structures on the substrate. The connection structures may include elastic components such as chevron spring, and torsion spring. In some examples, as shown in FIG. 5C, a single connection structure, such as a torsion bar, can be provided to connect between the axial portion and the substrate. In all these examples, the connection structures can provide physical connections between the polygon and the substrate, especially in a case where the actuators do not provide physical connections to the substrate, such as electrostatic and electromagnetic actuators. In addition, the connection structures can also stabilize the polygon when the light steering system vibrates due to, for example, movements of the vehicle that carries the light steering system. Performance degradation of the light steering system (e.g., light dispersion) due to vibration can be reduced as a result.

With the disclosed techniques, a solid-state polygon assembly including a polygon and an actuator formed in a MEMS can be provided. The solid-state polygon assembly can be configured as a light steering system to provide a 360-degree FOV based on the rotation of a single polygon component, rather than the rotation of multiple arrays of micro-mirrors which need synchronization. On the other hand, the reliability and precision issues associated with mechanical polygon assemblies can be avoided, as the components of the solid-state polygon assembly are light weight and are typically fabricated on a semiconductor substrate as a unitary structure, rather than being assembled together as separate moving parts. All these can improve the performance of the light steering system.

Examples of solid-state polygon assembly can be fabricated on two semiconductor substrates. Each semiconductor substrate can include a silicon-on-insulator (SOI) substrate. Referring to FIG. 7A, FIG. 7B and FIG. 8A-FIG. 8E, the polygon can be fabricated from a back surface of a first SOI substrate, whereas the axial portion of the support structure can be fabricated from a front surface of the first SOI substrate. In a case where the polygon includes tiled facets, an anisotropic etching process can be performed on the back surface. Wet etching techniques can be employed to preferentially remove the silicon material along directions governed by crystallographic orientation of the silicon to create the tiled facets of the polygon. In addition, the radial portions of the support structure, the connection structures, and the actuators, can be fabricated from a frontside surface of a second SOI substrate. In some examples, in a case where the actuators comprise comb drives, a deep reactive-ion etching (DRIE) process can be performed on the frontside surface of the second SOI substrate to create deep trenches for the fingers of the comb drives. An etching process can also be performed on the back side surface of the second SOI substrate to create a backside cavity that allow the movement of the radial portions and the actuators. A wafer bonding operation can then be performed to bond the axial portion (from the first SOI structure) with the radial portion (from the second SOI structure) to form the solid-state polygon assembly.

Typical System Environment for Certain Examples

FIG. 1A illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, or an amplitude modulated continuous wave (AMCW) signal. LiDAR module 102 can detect the object based on the reception of light signal 110 and can perform a ranging determination (e.g., a distance of the object) based on a time difference between light signals 108 and 110. For example, as shown in FIG. 1A, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

LiDAR module 102 typically includes a light steering system. The light steering system can be part of the transmitter of the LiDAR module to steer light towards different directions to illuminate objects around the vehicle. Based on a time difference between the transmitted and reflected signals, distances between the obstacles and the vehicle can be determined, as described above in FIG. 1A. The performance of a light steering system can be evaluated based on various metrics, such as field of view (FOV). The FOV can define the extent of a scene to be detected/illuminated by the light steering system. It is desirable that the light steering transmitter can provide a 360-degree horizontal FOV so as to project light and to detect objects in all directions around the vehicle, to avoid blind spots in the object detection operations. Specifically, if LiDAR module 102 can only provide a less than 360-degree horizontal FOV, objects in parts of the scene that are outside the FOV may become undetected by LiDAR module 102. The undetected objects can pose danger to the operation of the vehicle.

Figure 1B:
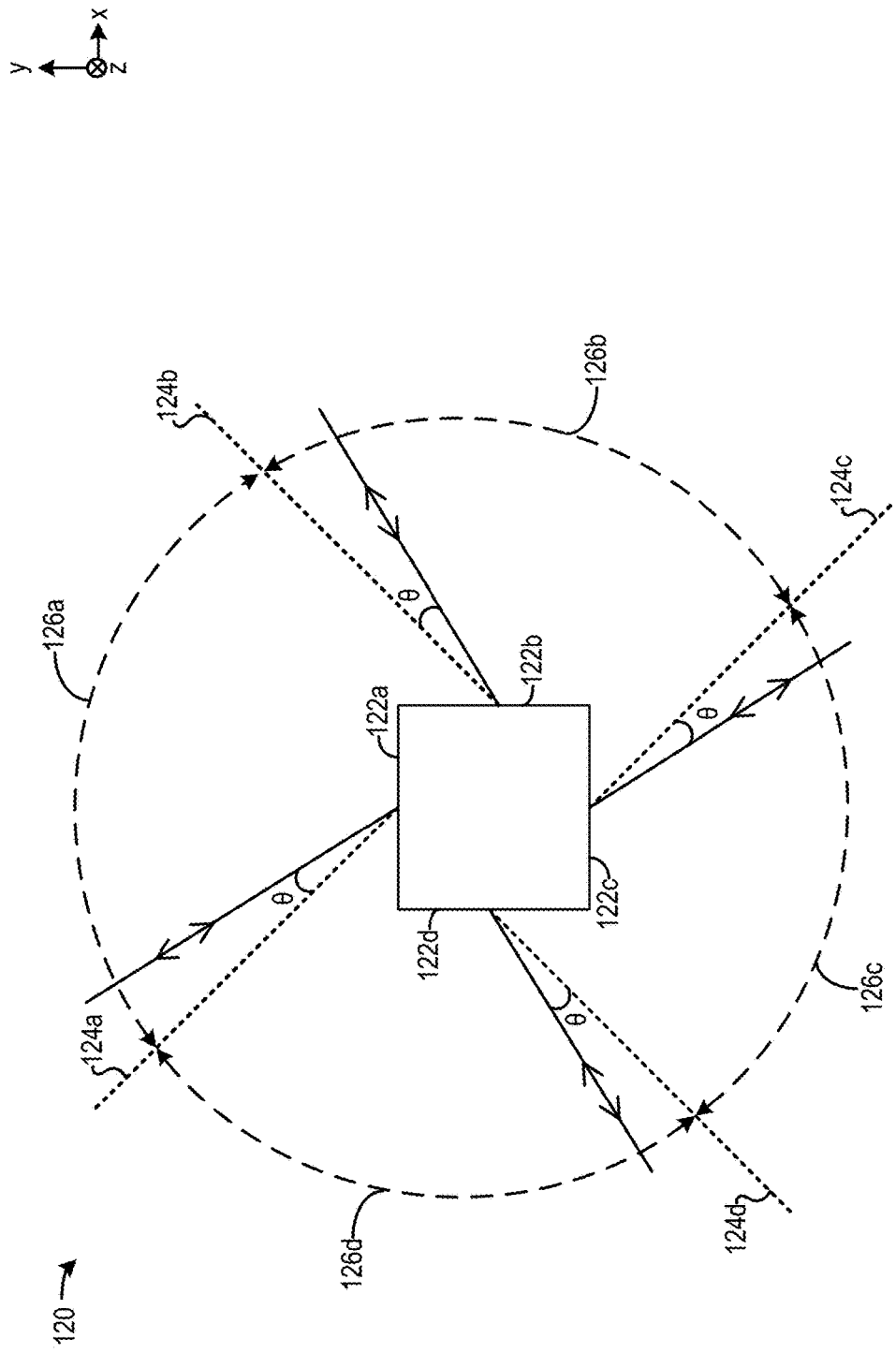

FIG. 1B illustrates an example light steering system 120 that can provide a 360-degree FOV. As shown in FIG. 1B, light steering system 120 can include a plurality of light reflecting surfaces 122a, 122b, 122c, and 122d. Each light reflecting surface can reflect light from a light source (not shown in FIG. 1B) towards a particular direction. Each light reflecting surface can be rotated by a range of angles to scan across a range of directions, which forms a FOV for that light reflecting surface. Each light reflecting surface can project light towards the range of directions if used as part of a transmitter, or receive light from the range of directions (if used as part of a receiver. For example, light reflecting surface 122a can scan across a range of directions between directions 124a and 124b on the x-y plane forming a horizontal FOV 126a. Light reflecting surface 122b can scan across a range of directions between directions 124b and 124c forming a horizontal FOV 126b. Light reflecting surface 122c can scan across a range of directions between directions 124c and 124d forming a horizontal FOV 126c. Moreover, light reflecting surface 122d can scan across a range of directions between directions 124d and 124a forming a horizontal FOV 126d. Each light reflecting surface can also be rotated by a range of angles to receive light from its corresponding horizontal FOV.

The FOVs 126a, 126b, 126c, and 126d provided by each light reflecting surface can be combined to form a 360-degree horizontal FOV. To enable the FOVs to be combined, each light reflecting surface can be controlled according to a scanning pattern, in which each light reflecting surface is rotated by the same angles at different times. As a result, each light reflecting surface can direct/receive light along a direction that forms the same angle θ with a lower end of its corresponding FOV, and the angle θ varies with time according to the scanning pattern. With such arrangements, each light reflecting surface can scan through its corresponding FOV within the same time, which allows information obtained from each FOV to be combined. A 360-degree horizontal FOV can be provided as a result.

Figure 2A:
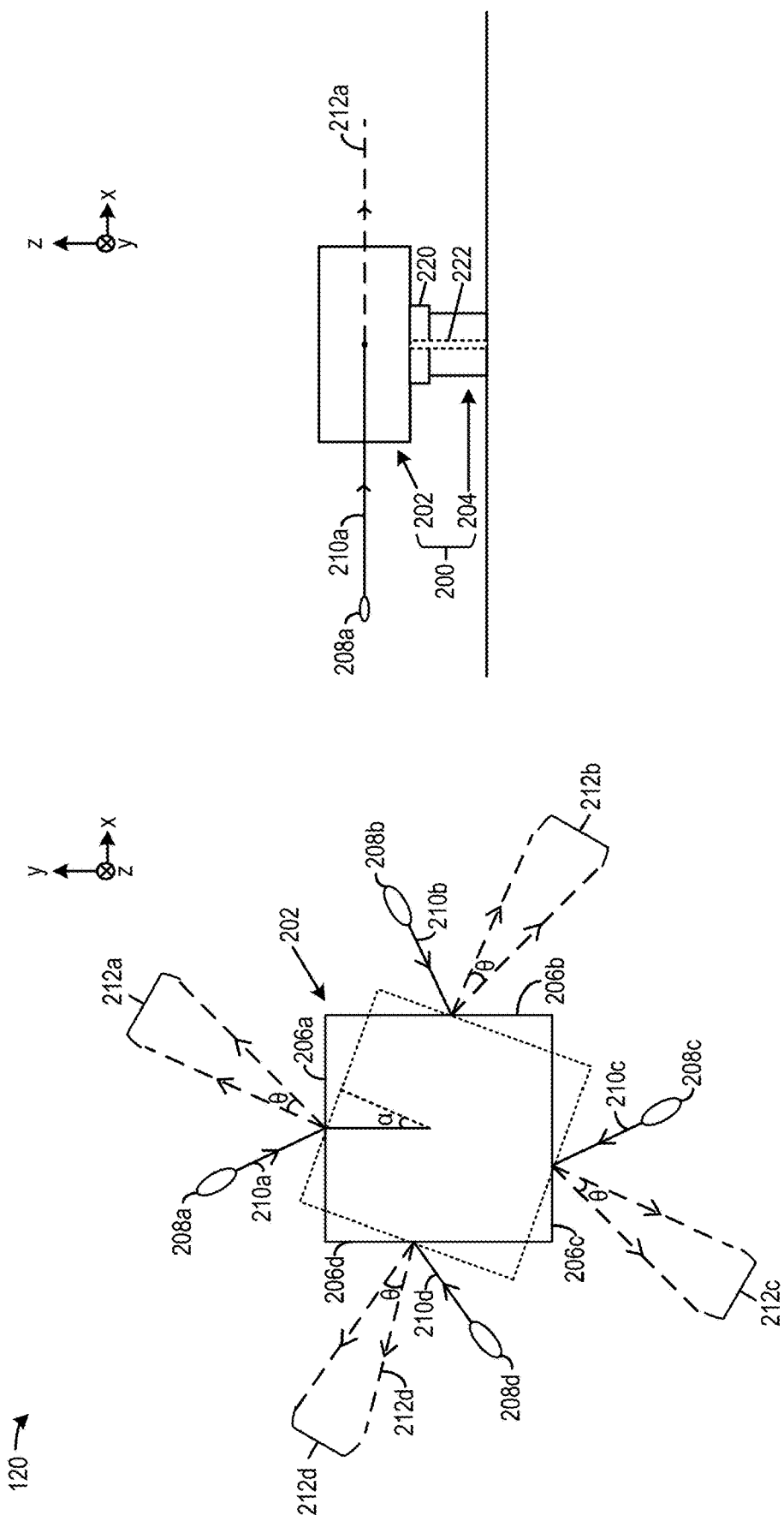
FIG. 2A and FIG. 2B illustrate examples of a light steering system.
Figure 2B:
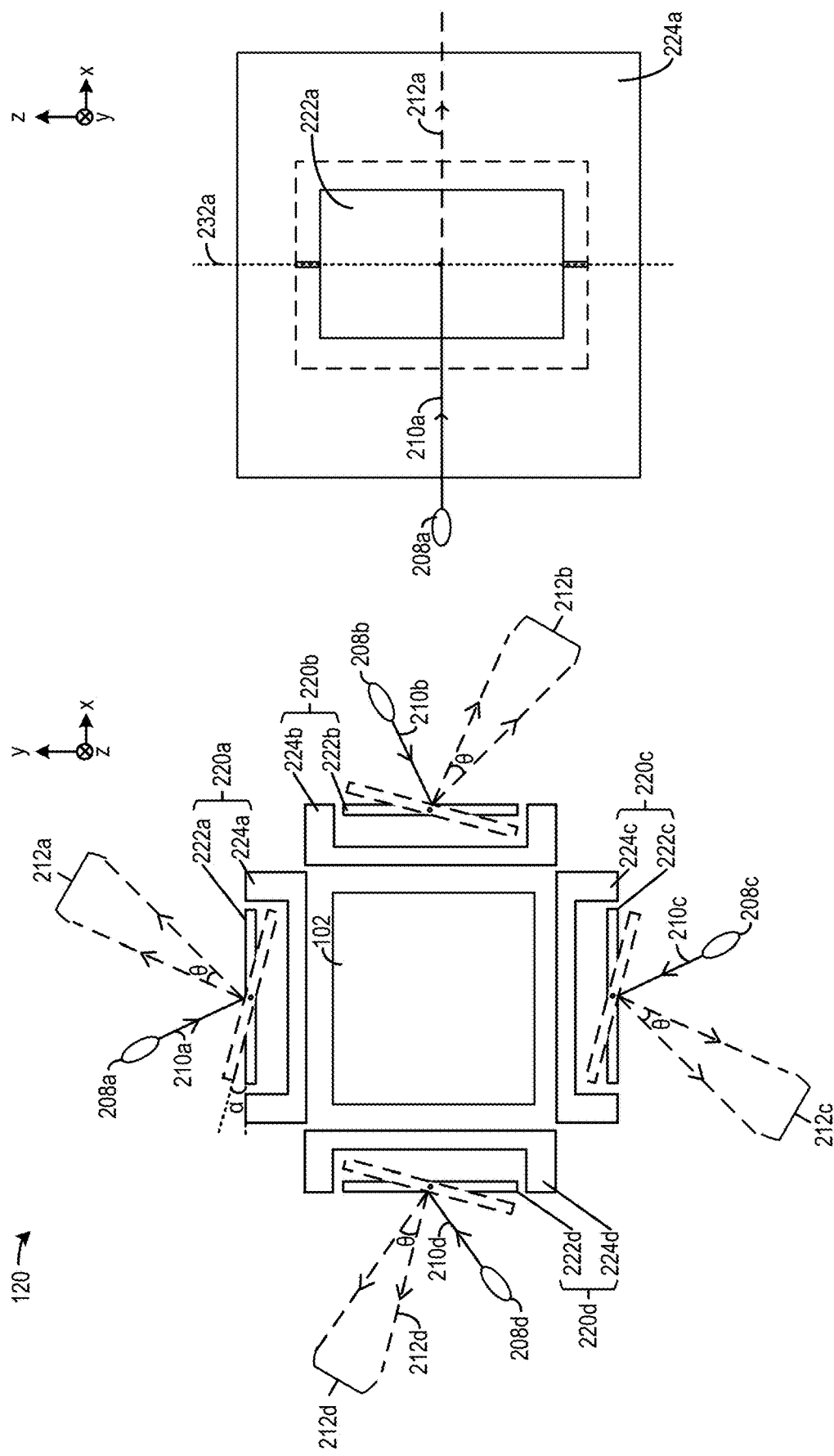

FIG. 2A and FIG. 2B illustrate example techniques to implement light steering system 120. FIG. 2A illustrates a mechanical polygon assembly 200 which can be used to implement light steering system 120. Referring to FIG. 2A, mechanical polygon assembly 200 can include a multi-facet polygon 202 and a motor 204 mounted below polygon 202 to support and rotate the polygon. Polygon 202 is typically made of a metal with each facet, including facets 206a, 206b, 206c, and 206d polish able to form a mirror. Light steering system 120 can also include a plurality of light sources 208a, 208b, 208c, and 208d positioned around polygon 202 along the radial directions (e.g., parallel with the x-axis or y-axis). Each light source can project light to a corresponding facet, which can reflect the light outward to a particular direction. For example, light source 208a can project light 210a to facet 206a, which can reflect the light as light 212a. In addition, light source 208b can project light 210b to facet 206b, which can reflect the light as light 212b. Light source 208c can also project light 210c to facet 206c, which can reflect the light as light 212c. Furthermore, light source 208d can project light 210d to facet 206d, which can reflect the light as light 212d.

To perform a scanning operation, motor 204 can be controlled according to a scanning pattern, in which polygon 202 is rotated by specific angles at different times, to enable each facet to reflect light to different locations in the surroundings of the mirror assembly. For example, when motor 204 rotates by an angle α, each facet of polygon 202 also rotates by the same angle α, while the reflected light from each facet also changes direction by the same angle θ, with the angles α and θ varying with time according to the scanning pattern to provide a FOV for the facet. With such arrangements, each facet of polygon 202 can scan across its corresponding FOV within the same time, and the FOVs of each facet can be combined to provide an aggregate 360-degree FOV without the motor rotating the polygon by a full 360 degrees.

Although mechanical polygon assembly 200 can provide a 360-degree FOV, it can have reliability and precision issues which can degrade the overall performance of the light steering system. Specifically, as described above, polygon 200 is typically made of metal to provide smooth and polishable light reflecting surfaces, which makes it bulky and heavy. As motor 204 needs to support the heavy weight of polygon 202, various mechanical parts that connect the polygon to the motor, such as bearings 220, and shaft 222, can be subject to substantial wear and tear; which can reduce the lifetime and the reliability of mechanical polygon assembly 200. The wear and tear, and the resulting reliability degradation, can be further exacerbated when motor 204 rotates polygon 202 at a high speed to scan through the 360-degree FOV at a particular scanning frequency, in order to provide vehicle 100 with updated information about its surrounding.

In addition, the bulky, heavy polygon 202 can also introduce precision issues. Specifically, it may be challenging to balance and align bulky polygon 202 on motor 204. An unbalanced or misaligned polygon 202 can cause light to be reflected to unintended directions. For example, instead of reflecting the light outwards along a horizontal direction, the facets of the unbalanced or misaligned polygon 202 may reflect light upwards or downwards, or to other unintended directions. Combined with other physical challenges posed by the polygon assembly (e.g., frictions, moment of inertia, etc.), it becomes difficult to control polygon 202 to reflect light towards specific directions according to the scanning pattern. As a result, imprecision can be introduced to the scanning operation. All these can degrade the optical performance of the mechanical polygon assembly.

FIG. 2B illustrates a set of micro-mirror assemblies which can be used to implement light steering system 120. As shown in FIG. 2B, a micro-mirror assembly, including micro-mirror assemblies 220a, 220b, 220c, and 220d, can be positioned on four sides of LiDAR module 102 facing outwards along the horizontal direction (on the x-y plane). Each micro-mirror assembly can include a micro-mirror and an actuator (not shown in FIG. 2B) formed on a semiconductor substrate as a micro-electromechanical system (MEMS). For example, micro-mirror assembly 220a includes a micro-mirror 222a formed on a substrate 224a, micro-mirror assembly 220b includes a micro-mirror 222b formed on a substrate 224b, micro-mirror assembly 220c includes a micro-mirror 222c formed on a substrate 224c, whereas micro-mirror assembly 220d includes a micro-mirror 222d formed on a substrate 224d. In some examples, instead of a single micro-mirror, an array of micro-mirrors can be formed on each side of LiDAR module 102.

Light steering system 120 can also include light sources 208a, 208b, 208c, and 208d positioned around LIDAR module 102 along the radial directions (e.g., parallel with the x-axis or y-axis). Each light source can project light to a corresponding micro-mirror assembly, which can reflect the light outward to a particular direction. For example, light source 208a can project light 210a to micro-mirror 222a, which can reflect the light as light 212a. In addition, light source 208b can project light 210b to micro-mirror 222b, which can reflect the light as light 212b. Light source 208c can also project light 210c to micro-mirror 222c, which can reflect the light as light 212c. Furthermore, light source 208d can project light 210d to micro-mirror 222d, which can reflect the light as light 212d. Each micro-mirror can rotate around a rotation axis on the substrate. For example, micro-mirror 222a can rotate around a rotation axis 232a on substrate 224a. The rotation angle of the micro-mirror can set a direction of the reflected light.

To perform a scanning operation, each of micro-mirror 222a, 222b, 222c, and 222d can be controlled to rotate by the same angle α according to a scanning pattern, which in turn changes the direction of the reflected light from each micro-mirror by the same angle θ, with the angles α and θ varying with time according to the scanning pattern to provide a FOV for each micro-mirror. With such arrangements, each micro-mirror can scan across its corresponding FOV within the same time, and the FOVs of each micro-mirror can be combined to provide an aggregate 360-degree FOV.

Compared with mechanical polygon assembly 200 of FIG. 2A, a micro-mirror in FIG. 2B is light weight and can be controlled to rotate at a high speed and by pre-determined angles with a high precision. Moreover, as the micro-mirror and the actuator are typically fabricated on a semiconductor substrate as a unitary structure, rather than being assembled together as separate moving parts, the imprecise alignment and balancing issues associated with mechanical polygon assemblies can be avoided or at least mitigated. All these can improve the performance of the light steering system.

Although the micro-mirror assemblies of FIG. 2B can provide improved performance, they also have limitations that can degrade the performance of the light steering system. Specifically, as a micro-mirror can only rotate over a limited range of angles and cannot rotate by 360 degrees, a single micro-mirror (or a single array of micro-mirrors) cannot provide a 360-degree FOV. To achieve a 360-degree FOV, multiple micro-mirrors each facing a different direction are needed, as shown in FIG. 2B, and each micro-mirror needs to be rotated by the same angle to mimic the movements of the different facets of a polygon. But such arrangements require synchronization between the micro-mirrors, to ensure that the micro-mirrors rotate by the same target rotation angle. If there are mismatches in the rotation angles between the micro-mirrors, the LiDAR system may be unable to project light to a certain directions within the scanning operation, which can lead to blind spots. Moreover, in a case where an array of micro-mirrors is placed on each side of the LiDAR module, synchronization among the micro-mirrors within the same array is needed so that the micro-mirrors all rotate by the same angle to provide the same optical property as a single micro-mirror. But mismatches in the rotation angles among the micro-mirrors within an array can cause dispersions in the reflected light, which reduces the resolution of the scanning operation. All these can degrade the performance of the light steering system.

Example Techniques to Provide Extended FOV

FIG. 3A to FIG. 5E illustrate examples of a solid-state light steering system 300 that can address at least some of the issues described above. Referring to FIG. 3A, solid-state light steering system 300 can include a polygon assembly 302 implemented on a silicon substrate 304, as well as a controller 306 formed in silicon substrate 304. Polygon assembly 302 can be in the form of a MEMS and can include a polygon 310, a support structure 312, actuators 314, and anchors 316.

Specifically, polygon 310 can include multiple light-reflecting facets, with each facet configured to reflect light from a light source. Solid-state light steering system 300 can be positioned such that all of the facets of the polygon face the surrounding of a vehicle. Support structure 312 can include an axial portion 320 and a plurality of radial portions 322. Polygon 310 and axial portion 320 are stacked along and center around a first axis 321 that is perpendicular to a surface 318 of substrate 304. Polygon 310 and axial portion 320 are rotatable around first axis 321. The plurality of radial portions 322 extend from axial portion 320 along a second axis (e.g., x-axis or y-axis) parallel with surface 318. The plurality of radial portions 322 can be connected to actuators 314. Anchors 316 are connected surface 318 and are connected to actuators 314. As to be described below, polygon 310, support structure 312, actuators 314, and anchors 316 can be fabricated from silicon wafers, such as single silicon crystal wafers. In the example shown in FIG. 3A, polygon 310 includes four facets and has a square footprint. Support structure 312 can include radial portions 322a, 322b, 322c, and 322d connected to, respectively, actuators 314a, 314b, 314c, and 314d; which are connected to, respectively, anchors 316a, 316b, 316c, and 316d. In some examples, polygon 310 can have a different number of facets (e.g., three facets, five facets), a different footprint shape (e.g., a triangle, a pentagon), and a different number of radial portions, actuators, and anchors. A typical dimension of polygon 310 can be in the order of millimeters.

Referring to FIG. 3A, controller 306 can perform a scanning operation by rotating, using actuators 314, polygon 310 and axial portion 320. Specifically, controller 306 can control each of actuators 314a, 314b, 314c, and 314d to a same force (same magnitude and same direction) to respectively, radial portions 322a, 322b, 322c, and 322d. The forces can create a torque to rotate polygon 310 with respect to anchors 316. For example, in a case where actuators 314 push radial portions 322 away from anchors 316, polygon 310 can rotate counter-clockwise (indicated by direction A), whereas in a case where actuators 314 pull radial portions 322 towards anchors 316, polygon 310 can rotate clockwise (indicated by direction B). In the examples of FIG. 3A and FIG. 3B, radial portions 322, actuators 314, and anchors 316 can be arranged such that each actuator can be controlled to exert the same force (same magnitude and same direction) to its corresponding radial portion to achieve a target rotation angle, which can simplify control of polygon 310.

Similar to the scanning operation of mechanical polygon assembly 200, controller 306 can control actuators 314 according to a scanning pattern, in which polygon 310 is rotated by specific angles at different times, to enable each facet of polygon 310 to reflect light from a light source to different locations in the surroundings. The range of reflection directions of light provided by each facet can correspond to a FOV. As each facet of polygon 310 can scan across its corresponding FOV at the same time as polygon 310 rotates, the FOV provided by each facet of polygon 310 can be combined to provide an aggregate 360-degree FOV.

FIG. 4A, FIG. 4B, FIG. 4C, and FIG. 4D illustrate example arrangements of polygon 310 and light sources of light steering system 300. FIG. 4A illustrates an example of light steering system 300 including polygon 310, axial portion 320, radial portions 322a and 322b, and anchors 316a and 316b formed on surface 318 of substrate 304. In the example of FIG. 4A, each facet of polygon 310, including facets 402a, 402b, and 402c, can be perpendicular to substrate surface 318 of substrate 304. Light sources 404 can be positioned around the polygon along the radial directions (e.g., along the x-axis/y-axis), with each facet configured to reflect light from one of the light sources. In the example of FIG. 4A, light source 404a can project light 410a to facet 402a to be reflected as light 412a, light source 404b can project light 410b to facet 402b to be reflected as light 412b, light source 404c can project light 410c to facet 402c to be reflected as light 412c, whereas light source 404d can project light 410d to facet 402d to be reflected as light 412d. In a case where light steering system 300 is part of a receiver, a photodetector can be included to form a coaxial architecture with each light source 404. The photodetector can include, for example, an avalanche photodiode (APD), a silicon photomultiplier (SiPM), a single-photon avalanche diode (SPAD), etc. Each coaxial architecture can further include a beam splitting element, which allows transmitting of laser light to the far field, while reflecting part of the receiving light signal back onto the photodetector.

To ensure that each light source is not positioned in the reflected light path, polygon assembly 302 can be arranged such that when polygon 310 is at a default position (e.g., when actuators 314 provide no torque), each facet reflects the light away from the corresponding light source. Moreover, controller 306 can control actuators 314 (not shown in FIG. 4A) to rotate polygon 310 in a clockwise direction (direction B) to enable each facet to scan across a FOV, to reflect the light further away from the light source. The number of facets and/or the range of rotation of polygon 310 can also be designed such that the aggregate FOV from each facet equals 360 degrees.

FIG. 4B illustrates another example of arrangements of polygon 310 and light sources 404. As shown in FIG. 4B, each facet of polygon 310, including facets 402a, 402b, and 402c, can be tilted with respect to substrate surface 318 of substrate 304. In some examples, the tilting angle β between the facets and surface 318 can be defined based on the crystallographic orientation of the silicon and can be around 54.7 degrees. Light sources 404 can be positioned above polygon 310 (e.g., along the z-axis). Each facet can receive light from one of the light sources above and reflect the light outwards along a radial direction (e.g., along the x-axis/y-axis) to provide the horizontal FOV. In the example of FIG. 4B, light source 404a can project light 410a to facet 402a to be reflected as light 412a, light source 404b can project light 410b to facet 402b to be reflected as light 412b, light source 404c can project light 410c to facet 402c to be reflected as light 412c, whereas light source 404d can project light 410d to facet 402d to be reflected as light 412d.

With the arrangements of FIG. 4B, light sources 404 do not obscure the reflective paths of the light from each facet regardless of the rotation angle and the rotation direction of polygon 310. For example, polygon 310 can be rotated clockwise (towards direction B) or counterclockwise (towards direction A) in a scanning operation without reflecting the light back any of the light sources. As a result, the achievable FOV for each facet can be extended, and the number of facets required to achieve a 360-degree FOV can be reduced. Such arrangements can reduce the complexity of fabrication of the polygon and the solid-state light steering system.

In some examples, light steering system 300 can include optical components between one or more light sources 404 and polygon 310. In some examples, the optical components can direct light from a single light source 404 onto the facets of polygon 310, instead of having a dedicated light source for each facet, which can reduce the number of light sources and save power. In some examples, the optical components can also generate a pattern of light beams and project the pattern of light beams onto the facets of polygon 310, which then reflect the pattern of light beams outward as polygon 310 rotates. The pattern of light beams can include, for example, a pattern of collimated light beams. The projection and reflection of collimated light beams can reduce the dispersion of light when the light exits polygon 310, which can increase the range and resolution of the scanning operation.

FIG. 4C and FIG. 4D, illustrate examples of optical components of light steering system 300. As shown in FIG. 4C, light steering system 300 can include an array of parallel light guides 420 including, for example, light guides 420a, 420b, 420c, 420d, 420e, 420f, 420g, and 420h. Each light guide can be implemented using, for example, optical fibers, optical waveguides, etc. In FIG. 4C, the array of light guides 420 can receive light 432 from a light source, such as light source 404a, and direct the light as light beams 434 towards polygon 310. Due to the parallel arrangement of the light guides, light beams 434 can be in the form of collimated light beams. Different subsets of light guides can project collimated light beams onto different facets of polygon 310. For example, light guides 420a and 420b and direct, respectively, collimated light beams 434a and 434b onto facet 402a and reflected as collimated light beams 444a and 444b. Light guides 420c and 420d and direct, respectively, collimated light beams 434c and 434d onto facet 402b and reflected as collimated light beams 444c and 444d. Moreover, light guides 420e and 420f and direct, respectively, collimated light beams 434e and 434f onto facet 402c and reflected as collimated light beams 444e and 444f. Further, light guides 420g and 420h and direct, respectively, collimated light beams 434g and 434h onto facet 402d and reflected as collimated light beams 444g and 444h.

Referring to FIG. 4D, in some examples the optical components of light steering system 300 include mechanisms to set an incident angle of collimated light beams 434 with the tilted facets of polygon 310 to ensure that reflected light beams propagate along the X-Y plane for a given tilted angle β. For example, as shown in FIG. 4D, light steering system 300 may include an optical coupler 450, which can include an optical turning feature 452 that changes the propagation direction of collimated light beams 434. Optical turning feature 452 may include, for example, diffractive gratings, optical facets, refractive index structures, volume holograms, and optical beam splitting prisms. In some examples, light steering system may also include a lens to perform free-spacing coupling to steer collimated light beams 434 onto the tilted facets of polygon 310.

FIG. 5A, FIG. 5B, and FIG. 5C illustrate examples of actuators 314. Referring to FIG. 5A, each of actuators 314a, 314b, 314c, and 314d can include, respectively, electrostatic actuators 502a, 502b, 502c, and 502d. Each electrostatic actuator can include a pair of angular comb drive electrodes with gaps in between. When a voltage V is applied across each pair of comb drives creating a potential difference, opposite charges can accumulate, and an equal electrostatic force F1 can be created to pull each radial portion 322 (e.g., 322a, 322b, 322c, and 322d) towards its corresponding anchor 316 (e.g., 316a, 316b, 316c, and 316d) according to the following Equation:

$$F1 = -P(V1)^2 \quad \text{(Equation 1)}$$

In Equation 1, P is a constant based on permittivity, a gap distance between the electrodes, etc. As shown in Equation 1, the electrostatic force (and the resulting net torque) can be directly proportional to a square of applied voltage.

The electrostatic force can create a torque to rotate radial portions 322 and polygon 310 in a clockwise direction (direction B) around rotation axis 321. Depending on the target rotation angle, controller 306 can determine the required torque and the voltage across the pair of comb drives at each of electrostatic actuators 502a, 502b, 502c, and 502d, and apply the voltage across Each electrostatic actuator to rotate polygon 310 by the target rotation angle.

Polygon assembly 302 of FIG. 5A may further include one or more connection structures to provide physical connection between support structure 312 (and polygon 310) and substrate 304 and to define the default orientation of polygon 310, given that electrostatic actuators 502a-502d do not provide physical connections between radial portions 322 and anchors 316. The connection structures can be deformable to accommodate the rotation of radial portions 322, and the spring stiffness of the connection structures can determine the torque required to achieve a target rotation angle. The connection structures can also stabilize polygon 310 when light steering system 300 vibrates due to, for example, movements of vehicle 100 which carries light steering system 300. Performance degradation of light steering system 300 (e.g., light dispersion) due to vibration can be reduced as a result.

FIG. 5B and FIG. 5C illustrate examples of connection structures. As shown in FIG. 5B, in addition to electrostatic actuators 502a-502d and anchors 316a-316d, polygon assembly 302 further includes a plurality of radial connection structures 512 including, for example, radial connection structures 512a, 512b, 512c, and 512d, each of which comprises a elastic structure connected between one of the radial portions 322 and another corresponding anchor (separate from anchors 316a-316d) on substrate 304, to provide physical connections between radial portions 322 and substrate 304. For example, radial connection structure 512a includes a spring 514a connected between an anchor 516a and radial portion 322a. Radial connection structure 512b includes a spring 514b connected between an anchor 516b and radial portion 322b. Radial connection structure 512c includes a spring 514c connected between an anchor 516c and radial portion 322c. Radial connection structure 512d includes a spring 514d connected between an anchor 516d and radial portion 322d. The spring stiffness K of each of connection structures 512a-512d can define a torque τ required to rotate polygon 310 by a certain rotation angle, as follows:

$$\tau = -K\theta \quad \text{(Equation 2)}$$

During the scanning operation to rotate polygon 310 by a target rotation angle θ, controller 306 can determine a torque τ based on the target rotation angle θ and Equation 2 above, and then determine the voltage V1 to generate the torque based on Equation 1 above. Controller 306 can then supply voltage V1 to each of electrostatic actuators 502a-502d to generate an equal force at each actuator, which can stretch springs 514a-514d of each connection structure to rotate polygon 310. The torque can rotate polygon 310 clockwise (direction B) by the target angle θ. After the scanning operation completes, controller 306 can apply a zero voltage across each of electrostatic actuators 502a-502d to remove the torque. Springs 514a-514d of each of radial connection structures 512a-512d can then recoil to rotate polygon 310 counter-clockwise (direction A) back to its default orientation.

Various types of springs can be used as spring 514a-514d in radial connection structures 512a-512d. In the example shown in FIG. 5B, chevron springs can be used as springs 514a-514d. Chevron springs can maintain the alignment of polygon 310 with rotation axis 321 during the rotation. Specifically, a chevron spring, such as chevron spring 514a, has much larger spring stiffness along a radial direction (e.g., direction C) than along a tangential direction (e.g., direction D) of the rotation. As a result, each chevron spring can restrict the outward/inward movement of radial portions 322 as well as polygon 310, while allowing the rotational movement of radial portions 322 as well as polygon 310 around rotation axis 321. In some examples, other translational spring structures, such as a folded beam spring, a bending spring, etc., can also be used as springs 514a-514d.

In some examples, in additional or instead of radial connection structures 512a-512d, polygon assembly 302 may include an axial connection structure to connect between axial portion 320 of support structure 312 and substrate 304. FIG. 5C illustrates an example of an axial connection structure 522 that connects axial portion 320 (and polygon 310) to substrate 304. Polygon 310, axial portion 320 of support structure 312, and axial connection structure 522 can form a stack along and center around a first axis 321. Axial connection structure 522 can provide physical connection between support structure 312 and substrate 304. In addition, axial connection structure 522 can deform to allow polygon 310 to rotate, and the spring stiffness of connection structure 522 (together with the spring stiffness of radial connection structures 512 if they are present) can define the torque required to rotate polygon 310 by a particular rotation angle. In some examples, axial connection structure 522 can be in the form of a torsional bar.

FIG. 5D and FIG. 5E illustrate additional examples of actuators 314. Referring to FIG. 5D, each of actuators 314a, 314b, 314c, and 314d can include, respectively, an electromagnetic actuator 532a, 532b, 532c, and 532d. Each electromagnetic actuator includes a pair of electromagnets. To rotate polygon 310, controller 306 can apply a voltage across the pair of electromagnets to create an electromagnetic force between the electromagnets to provide a torque. In addition, referring to FIG. 5E, each of actuators 314a, 314b, 314c, and 314d can include, respectively, a piezoelectric actuator 542a, 542b, 542c, and 542d. To rotate polygon 310, controller 306 can apply a voltage across each piezoelectric actuator to cause the actuator to expand or to contract, which can create a pushing force or a pulling force to provide a torque. In both examples of FIG. 5D and FIG. 5E, polygon assembly 302 may include radial connection structures 512 and/or radial connection structures 522 to provide physical connections between support structure 312 and substrate 304, and to maintain the alignment of polygon 310 with rotation axis 321 during the rotation.

Method of Operating a Solid-State Polygon Assembly

FIG. 6 illustrates a method 600 for performing light steering operation using a polygon assembly of a solid-state light steering system, such as polygon assembly 302 of solid-state light steering system 300 of FIG. 3A-FIG. 5E. The solid-state light steering system can include a MEMS implemented on a silicon substrate, as well as a controller formed in the silicon substrate. The MEMS can include a polygon, a support structure, actuators, and anchors; all of which can be fabricated from silicon wafers, such as single silicon crystal wafers. A typical dimension of the polygon can be in the order of millimeters. The support structure can include an axial portion and a plurality of radial portions, and can be connected to the substrate via one or more connection structures. The polygon and the axial portion are stacked along and center around a first axis that is perpendicular to a surface of the substrate. The polygon and the axial portion are rotatable around the first axis. The one or more radial portions extend from the axial portion along a second axis parallel with the surface of the substrate and are connected with the actuators, which are in turn connected to the anchors on the surface of the substrate. The polygon can include multiple light-reflecting facets, with each facet configured to reflect light from a light source. The solid-state light steering system can be positioned such that all of the facets of the polygon face the surrounding of a vehicle. Method 600 can be performed by a controller, such as controller 306, in conjunction with polygon assembly 302.

In step 602, the controller can determine a target rotation angle of a polygon around a rotation axis. The rotation axis can be the first axis. Referring to FIG. 3B, the target rotation angle can be determined according to a scanning pattern, in which the polygon is rotated by specific angles at different times, to enable each facet to reflect light to different locations in the surroundings of the mirror assembly. The FOV provided by each facet of the polygon can be combined to provide an aggregate 360-degree FOV.

In step 604, the controller can determine a voltage based on the target rotation angle. The voltage can be determined based on a torque required to achieve the target rotation angle, and a property of the actuator that determines a relationship between the voltage and the torque, as described above in Equation 1. The voltage can also be determined based on the spring stiffness of the connection structures. For example, referring to FIG. 5B, radial connection structure 512a includes a spring 514a connected between an anchor 516a and radial portion 322a. Radial connection structure 512b includes a spring 514b connected between an anchor 516b and radial portion 322b. Radial connection structure 512c includes a spring 514c connected between an anchor 516c and radial portion 322c. Radial connection structure 512d includes a spring 514d connected between an anchor 516d and radial portion 322d. The spring stiffness K of each of connection structures 512a-512d can define a torque required to rotate polygon 310 by the target rotation angle. In addition, polygon assembly 302 may include an axial connection structure 522 to connect between axial portion 320 of support structure 312 and substrate 304. The spring stiffness of axial connection structure 522 can also define the torque required to rotate polygon 310 by the target rotation angle.

In step 606, the controller can apply the voltage across each actuator of the plurality of actuators, wherein the voltage causes each actuator to exert a torque on the support structure to rotate the polygon around the rotation axis by the target rotation angle. The torque can deform the connection structures to rotate the polygon.

Example Fabrication Process

FIG. 7A, FIG. 7B and FIG. 8A-FIG. 8D illustrate an example fabrication process 700 for the example solid-state polygon assembly shown in FIG. 3A-FIG. 5E. FIG. 6A and FIG. 6B illustrate the steps of fabrication process 600, whereas FIG. 8A-FIG. 8D illustrate a cross-sectional view of the polygon assembly corresponding to steps of fabrication process 700 in FIG. 7A and FIG. 7B.

Figure 7A:
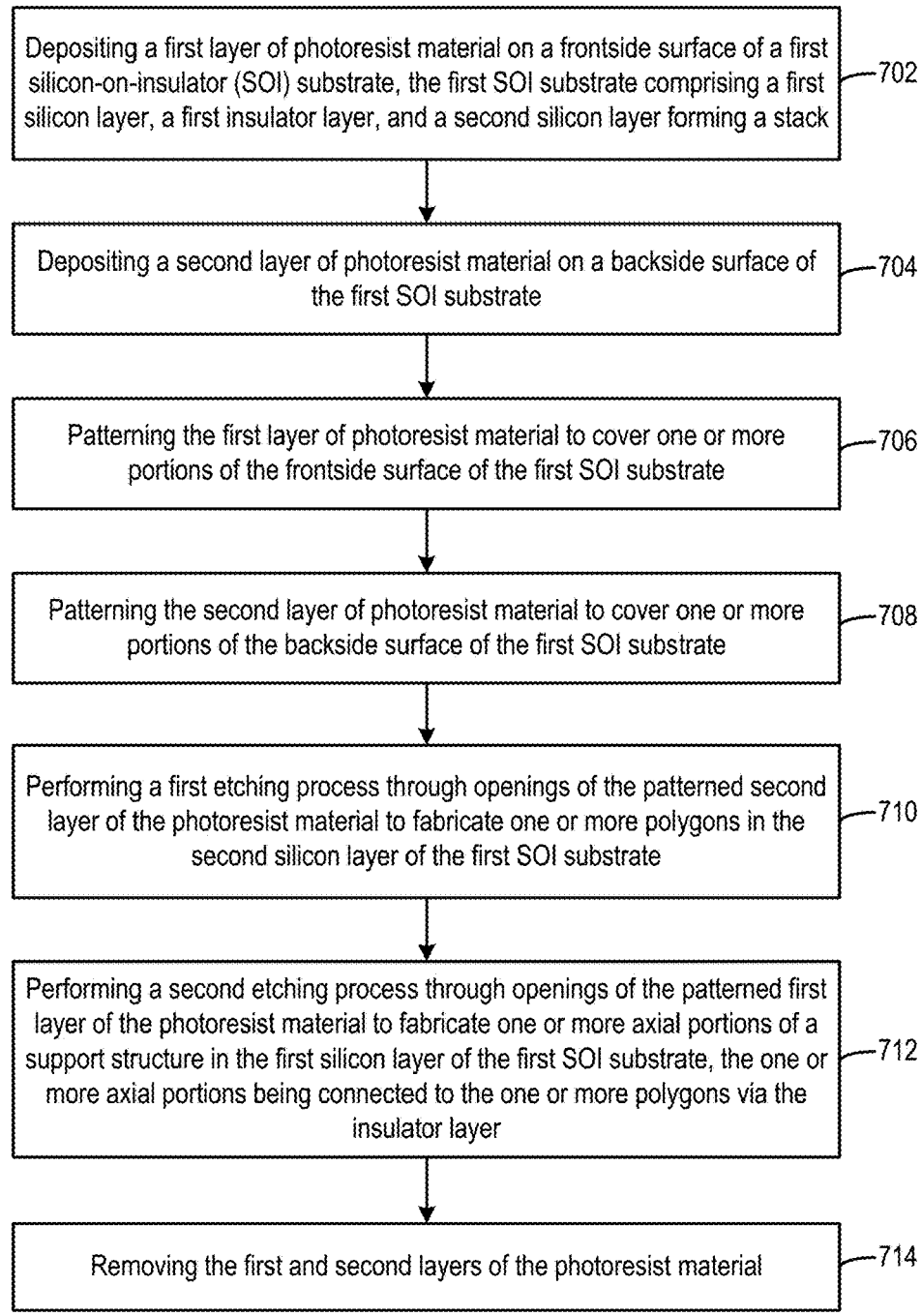

Referring to FIG. 7A and FIG. 8A, in step 702, a first layer of photoresist material 802 is deposited on a frontside surface of a first silicon-on-insulator (SOI) substrate 804, the first SOI substrate 804 comprising a first silicon layer 806, a first insulator layer 808, and a second silicon layer 810 forming a stack. In some examples, the frontside surface of first SOI substrate 804 may include a first alignment mark (not shown in the figures).

In step 704, a second layer of photoresist material 812 is deposited on a backside surface of the first SOI substrate 804.

In step 706, the first layer of photoresist material 802 can patterned. The patterned first layer of photoresist material 802 can cover one or more portions of the frontside surface of first SOI substrate 804. The patterned first layer of photoresist material 802 include one or more openings 818 (e.g., 818a and 818b) that expose the rest of the frontside surface of first SOI substrate 804. The patterning can be based on, for example, a photolithography operation. The covered portions of the frontside surface can correspond to axial portions 320 of one or more polygon assemblies 302, as well as the first alignment mark.

In step 708, the second layer of photoresist material 812 can be patterned to cover one or more portions of the backside surface of first SOI substrate 804. The patterned second layer of photoresist material 812 include one or more openings 822 (e.g., 822a and 822b) that expose the rest of the backside surface of first SOI substrate 804. The patterning can be based on, for example, a photolithography operation. At least some of the covered portions of the backside surface can correspond to top surfaces of polygons 310 of one or more polygon assemblies 302.

In step 710, a first etching process can be performed through openings 822a and 822b of the patterned second layer of photoresist material 812 to fabricate one or more polygons 310 in second silicon layer 810. An anisotropic etching operation can be performed to fabricate the facets of the polygons. The etching process can stop when first insulator layer 808 is reached and exposed. In some examples, an anisotropic wet etching operation can be performed to preferentially remove the silicon material along directions governed by crystallographic orientation of the silicon to create the tiled facets of a polygon, such as the one shown in FIG. 4B. For example, in a case where silicon layer 810 has an <111> crystallographic orientation, the anisotropic wet-etching operation can create facets that are tilted by angle of 54.7 degrees with respect to the frontside/backside surfaces of first SOI 804. As another example, in a case where polygon 310 is to have perpendicular facets, such as the one shown in FIG. 4A, a plasma-etching operation, such as deep reactive ion etching (DRIE) operation, can be performed through openings 822a and 822b. In the example shown in FIG. 8A, a single polygon 310 can be fabricated.

Referring to FIG. 8B, in step 712, a second etching process can be performed through openings 818a and 818b of the patterned first layer of photoresist material 802 to fabricate one or more axial portions 320 in first silicon layer 806. A DRIE operation can be performed to create vertical sidewalls of the axial portions. The etching process can stop when first insulator layer 808 is reached and exposed. At the end of step 712, the one or more axial portions 320 can be connected to the one or more polygons 310 via first insulator layer 808. In the example of FIG. 8B, a single axial portion 320 is formed and connected to the single polygon 310 fabricated in step 710.

In step 714, first layer of photoresist material 802 and second layer of photoresist material 812 can be removed from first SOI substrate 804. At the end of step 714, the patterned first SOI substrate 804 includes a stack 824 comprising axial portions 320, first insulator layer 808, and polygons 310. Second silicon layer 810 may also include incomplete polygons 826.

Figure 7B:
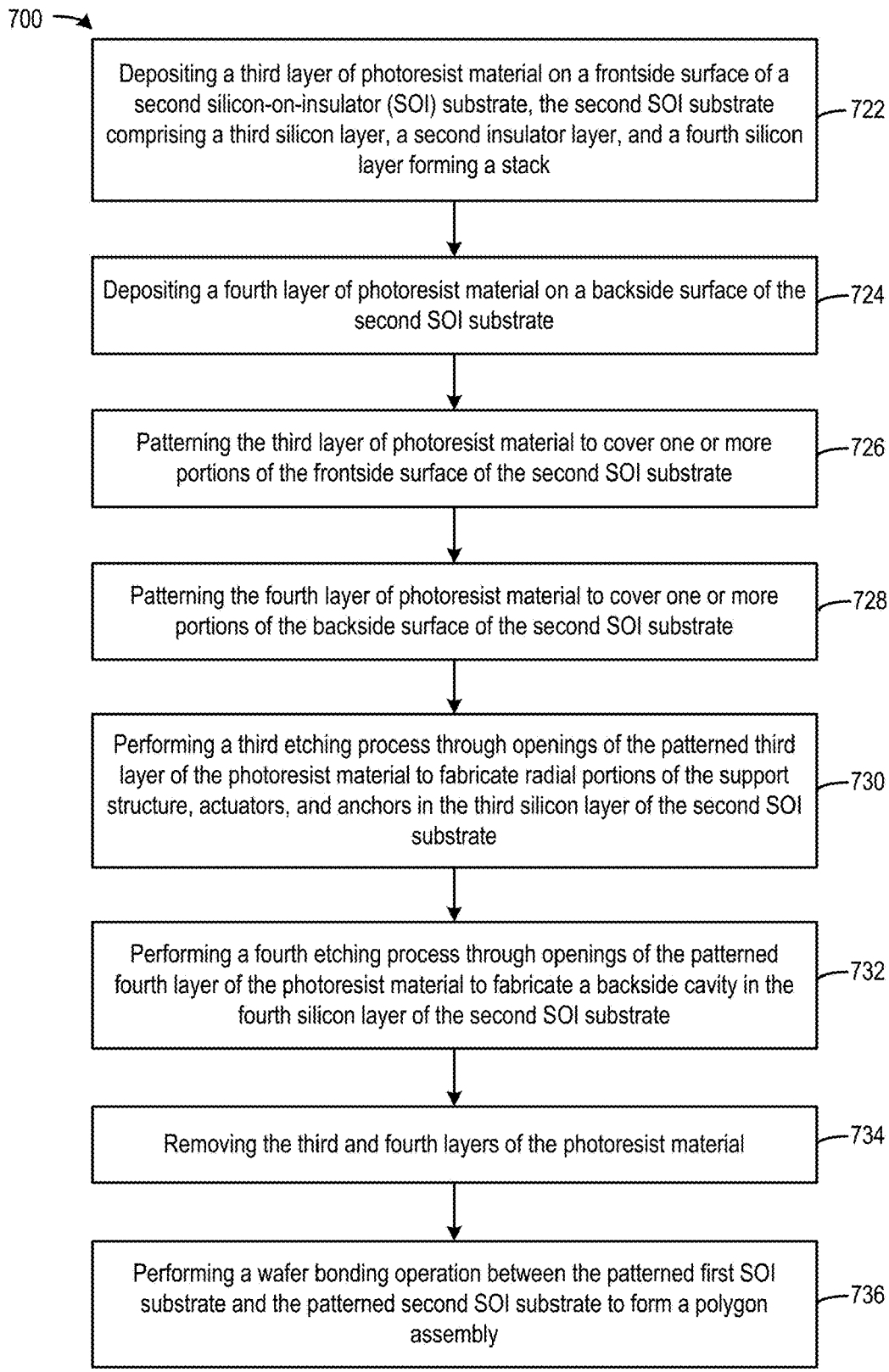

Referring to FIG. 7B and FIG. 8C, in step 722, a third layer of photoresist material 832 is deposited on a frontside surface of a second silicon-on-insulator (SOI) substrate 834, the second SOI substrate 834 comprising a first silicon layer 836, a second insulator layer 838, and a second silicon layer 840 forming a stack. In some examples, the frontside surface of second SOI substrate 834 may include a second alignment mark (not shown in the figures).

In step 724, a fourth layer of photoresist material 842 is deposited on a backside surface of second SOI substrate 834.

In step 726, the third layer of photoresist material 832 can patterned. The patterned third layer of photoresist material 832 can cover portions of the frontside surface of second SOI substrate 834. The patterned third layer of photoresist material 832 include openings 848 that expose the rest of the frontside surface of second SOI substrate 834. The patterning can be based on, for example, a photolithography operation. The covered portions of the frontside surface can correspond to radial portions 322 of support structure 312, actuators 314, anchors 316, connection structures 512 and 522, etc.

In step 728, the fourth layer of photoresist material 842 can patterned to cover one or more portions of the backside surface of second SOI substrate 834. The patterned fourth layer of photoresist material 842 include an opening 852 that exposes the rest of the backside surface of second SOI substrate 834. The patterning can be based on, for example, a photolithography operation. Opening 852 can correspond to a backside cavity, which provides a space to allow radial portions 322 to rotate.

In step 730, a third etching process can be performed through openings 838 of the patterned third layer of photoresist material 832 to fabricate radial portions 322 of support structure 312, actuators 314, anchors 316, connection structures 512 and 522, etc. in third silicon layer 836. An anisotropic etching operation, such as DRIE, can be performed. The etching process can stop when second insulator layer 838 is reached and exposed.

Referring to FIG. 7B and FIG. 8D, in step 732, a fourth etching process can be performed through opening 852 of the patterned fourth layer of photoresist material 842 to fabricate the backside cavity in fourth silicon layer 840. An anisotropic etching operation, such as DRIE, can be performed. The portion of the second insulator layer 838 underneath the radial portions, the actuators, and the connection structures can also be removed by the fourth etching process.

In step 734, third layer of photoresist material 832 and fourth layer of photoresist material 842 can be removed from second SOI substrate 834. At the end of step 734, the patterned second SOI substrate 834 includes support structure 312, actuators 314, anchors 316, connection structures 512 and 522, etc. formed above a backside cavity 860.

In step 736, the patterned first SOI substrate 804 and the patterned SOI substrate 834 can be bonded together by a wafer bonding operation to form polygon assembly 302. As part of step 736, axial portion 320 of first SOI substrate 804 can be aligned with a center of radial portions 322. The alignment can be based on, for example, measuring a degree of alignment between first alignment markings formed on first SOI substrate 804 and second alignment markings formed on second SOI substrate 834. The alignment can be a manual or an automatic operation and can be performed on an aligner, such as a contact aligner, a bonder aligner, etc. Following the alignment, first SOI substrate 804 and second SOI substrate 834 can be brought together. A wafer bonding operation, which can include a pre-bonding operation followed by an annealing operation at an elevated temperature (e.g., at 150 degrees), can then be performed to create direct silicon bonding between axial portion 320 and radial portions 322.

In step 740, after the bonding operation, dicing operations can be performed on semiconductor layer 804 and semiconductor layer 834. A polygon assembly 302 can be formed after the dicing operations, in step 742.

Although FIG. 7A and FIG. 7B illustrate a sequence of steps, it is understood that the sequential order of the steps can be different from the sequence illustrated in FIG. 7A and FIG. 7B. For example, steps 702-714 can be performed after or concurrent with steps 722-734. Moreover, the sequential orders of forming the photoresists can also be different from the sequential orders illustrated in FIG. 7A and FIG. 7B.

Computing System

Figure 9:
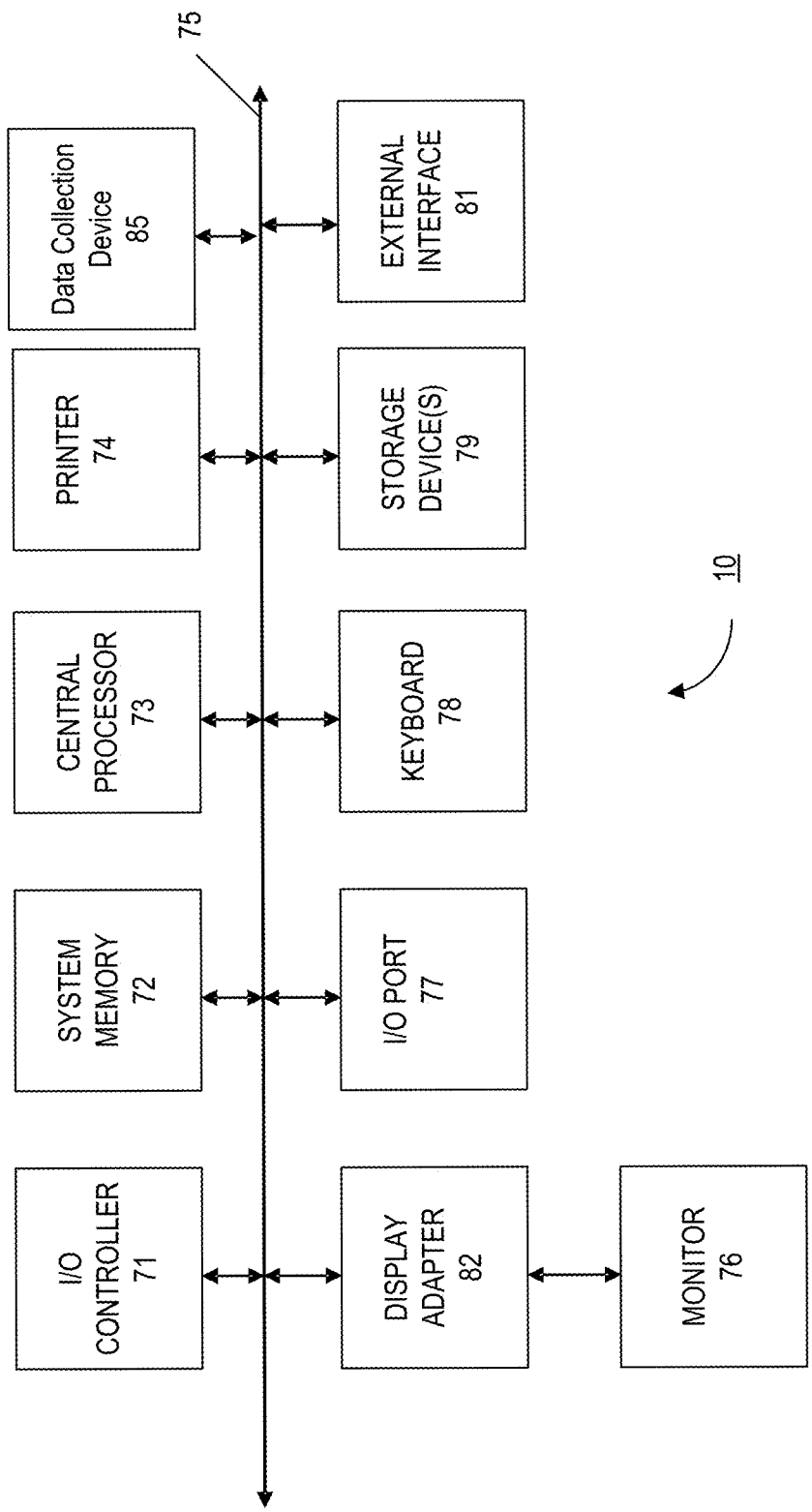
FIG. 9 illustrates an example computer system that may be utilized to implement techniques disclosed herein.

Any of the computing systems mentioned herein may utilize any suitable number of subsystems. Examples of such subsystems are shown in FIG. 9, in computing system 10. In some examples, a computing system includes a single computing apparatus, where the subsystems can be the components of the computing apparatus. In other examples, a computing system can include multiple computing apparatuses, each being a subsystem, with internal components. Computing system 10 can include, for example, a field-programmable gate array (FPGA), an application-specific integrated circuit (ASIC), and a general-purpose central processing unit (CPU), to implement the disclosed techniques, including the techniques described from FIG. 1A-FIG. 6, such as actuator controller 306. In some examples, computing system 10 can also include desktop and laptop computers, tablets, mobile phones, and other mobile devices.

The subsystems shown in FIG. 9 are interconnected via a system bus 75. Additional subsystems such as a printer 74, keyboard 78, storage device(s) 79, monitor 76 which is coupled to display adapter 82, and others are shown. Peripherals and input/output (I/O) devices, which couple to I/O controller 71, can be connected to the computing system by any number of means known in the art, such as I/O port 77 (e.g., USB, FireWire®). For example, I/O port 77 or external interface 81 (e.g., Ethernet or Wi-Fi) can be used to connect computing system 10 to a wide-area network such as the Internet, a mouse input device, or a scanner. The interconnection via system bus 75 allows the central processor 73, which can be an FPGA, an ASIC, a CPU, etc., to communicate with each subsystem and to control the execution of a plurality of instructions from system memory 72 or the storage device(s) 79 (e.g., a fixed disk, such as a hard drive or optical disk), as well as the exchange of information between subsystems. The system memory 72 and/or the storage device(s) 79 may embody a computer-readable medium. Another subsystem is a data collection device 85, such as a camera, microphone, accelerometer, and the like. Any of the data mentioned herein can be output from one component to another component and can be output to the user.

A computing system can include a plurality of the same components or subsystems, e.g., connected together by external interface 81 or by an internal interface. In some examples, computing systems, subsystems, or apparatuses can communicate over a network. In such instances, one computer can be considered a client and another computer a server, where each can be part of a same computing system. A client and a server can each include multiple systems, subsystems, or components.

Aspects of examples can be implemented in the form of control-logic-using hardware (e.g., an ASIC or FPGA) and/or using computer software with a generally programmable processor in a modular or integrated manner. As used herein, a processor includes a single-core processor, a multi-core processor on a same integrated chip, or multiple processing units on a single circuit board or networked. Based on the disclosure and teachings provided herein, a person of ordinary skill in the art will know and appreciate other ways and/or methods to implement examples of the present disclosure using hardware and a combination of hardware and software.

Any of the software components or functions described in this application may be implemented as software code to be executed by a processor using any suitable computer language, such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission. A suitable non-transitory computer-readable medium can include random access memory (RAM), a read-only memory (ROM), a magnetic medium such as a hard-drive or a floppy disk, or an optical medium such as a compact disk (CD) or digital versatile disk (DVD), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computing system), and may be present on or within different computer products within a system or network. A computing system may include a monitor, printer, or other suitable display for providing any of the results mentioned herein to a user.

Any of the methods described herein may be totally or partially performed with a computer system including one or more processors, which can be configured to perform the steps. Thus, examples can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a," "an," and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning including, but not limited to) unless otherwise noted. The term "connected" is to be construed as partly or wholly contained within, attached to, or joined together, even if there is something intervening. The phrase "based on" should be understood to be open-ended and not limiting in any way and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. A method of fabricating a polygon assembly of a Light Detection and Ranging (LiDAR) module, comprising:
   forming, on a backside surface of a first silicon-on-insulator (SOI) substrate, a multi-facet polygon of the polygon assembly;
   forming, on a frontside surface of the first SOI substrate, an axial portion of a support structure of the polygon assembly, the axial portion forming a stack with the polygon along a rotation axis;
   forming, on a frontside surface of a second SOI substrate, a plurality of radial portions of the support structure;
   forming, on a backside surface of the second SOI substrate, a cavity that encircles the plurality of radial portions; and
   bonding, based on a wafer bonding operation, the axial portion to the plurality of radial portions to form the polygon assembly.

2. The method of claim 1, further comprising:
   depositing a first layer of photoresist on the frontside surface of the first SOI substrate;
   patterning the first layer of photoresist to create first openings; and
   performing a first etching process through the first openings to fabricate the axial portion.

3. The method of claim 2, wherein the first etching process comprises an anisotropic etching process.

4. The method of claim 3, wherein the first etching process comprises a deep reactive-ion (DRIE) etching process.

5. The method of claim 2, wherein the first etching process stops upon reaching an insulator layer of the first SOI substrate.

6. The method of claim 2, further comprising:
   depositing a third layer of photoresist on the frontside surface of the second SOI substrate;
   patterning the third layer of photoresist to create third openings; and
   performing a third etching process through the first openings to fabricate the plurality of radial portions.

7. The method of claim 6, wherein the third etching process is performed through the first openings to further fabricate a plurality of first anchors, a plurality of actuators that connect between the plurality of first anchors and the plurality of radial portions, a plurality of second anchors, and a plurality of connection structures connected between the plurality of radial portions and the plurality of second anchors.

8. The method of claim 7, wherein the third etching process comprises an anisotropic etching process.

9. The method of claim 8, wherein the third etching process comprises a deep reactive-ion (DRIE) etching process.

10. The method of claim 7, wherein the third etching process stops upon reaching an insulator layer of the second SOI substrate.

11. The method of claim 10, further comprising:
    depositing a fourth layer of photoresist on the backside surface of the second SOI substrate;
    patterning the fourth layer of photoresist to create a fourth opening; and
    performing a fourth etching process through the fourth opening to fabricate the cavity.

12. The method of claim 11, wherein the fourth etching process removes a portion of the insulator layer underneath the plurality of radial portions, the plurality of actuators, and the plurality of connection structures.

13. The method of claim 1, further comprising:
    depositing a second layer of photoresist on the backside surface of the first SOI substrate;
    patterning the second layer of photoresist to create second openings; and
    performing a second etching process through the second openings to fabricate the multi-facet polygon.

14. The method of claim 13, wherein the second etching process comprises an anisotropic etching process.

15. The method of claim 14, wherein the second etching process comprises an anisotropic wet etching process to fabricate the polygon having tilted facets.

16. The method of claim 14, wherein the second etching process comprises a DRIE etching process to fabricate the polygon having vertical facets.

17. The method of claim 13, wherein the second etching process stops upon reaching an insulator layer of the first SOI substrate.

18. The method of claim 1, wherein the wafer bonding operation comprises aligning the axial portion and a center of the plurality of radial portions.

19. The method of claim 18, wherein the aligning is based on measuring a degree of alignment between first alignment markings on the frontside surface of the first SOI substrate and second alignment markings on the frontside surface of the second SOI substrate; and
    wherein the wafer bonding operation comprises a pre-bonding operation followed by an annealing operation.

20. A polygon assembly of a Light Detection and Ranging (LiDAR) module fabricated by a process comprising:
    forming, on a backside surface of a first silicon-on-insulator (SOI) substrate, a multi-facet polygon of the polygon assembly;
    forming, on a frontside surface of the first SOI substrate, an axial portion of a support structure of the polygon assembly, the axial portion forming a stack with the polygon along a rotation axis;
    forming, on a frontside surface of a second SOI substrate, a plurality of radial portions of the support structure;
    forming, on a backside surface of the second SOI substrate, a cavity that encircles the plurality of radial portions; and
    bonding, based on a wafer bonding operation, the axial portion to the plurality of radial portions to form the polygon assembly.

* * * * *